United States Patent
Sasaki et al.

(10) Patent No.: US 6,549,948 B1
(45) Date of Patent: *Apr. 15, 2003

(54) VARIABLE FRAME RATE ADJUSTMENT IN A VIDEO SYSTEM

(75) Inventors: Akitomo Sasaki, Kawasaki (JP); Hiroaki Sato, Kawasaki (JP); Tomoaki Kawai, Yokohama (JP); Hiroshi Okazaki, Yokohama (JP); Takeshi Namikata, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/544,153

(22) Filed: Oct. 17, 1995

(30) Foreign Application Priority Data

Oct. 18, 1994 (JP) .............................................. 6-252121
Nov. 30, 1994 (JP) .............................................. 6-296677
Nov. 30, 1994 (JP) .............................................. 6-297635

(51) Int. Cl.$^7$ .............................................. G06F 13/38
(52) U.S. Cl. ....................... 709/233; 709/234; 709/236; 709/232; 709/200; 710/34; 710/30; 710/36; 710/29
(58) Field of Search ....................... 395/200.01, 200.06, 395/200.11, 200.13, 200.21, 200.3, 200.54, 200.55, 200.62, 200.63, 200.64, 200.81; 345/302; 600/23; 386/52; 710/34, 30, 29, 36, 39; 702/223, 200, 232, 234, 236, 323

(56) References Cited

U.S. PATENT DOCUMENTS

| | | | | |
|---|---|---|---|---|
| 4,531,151 A | * | 7/1985 | Hentschke | 348/424 |
| 4,792,980 A | * | 12/1988 | Shimizu | 382/232 |
| 5,062,136 A | * | 10/1991 | Gattis et al. | 380/18 |
| 5,157,775 A | * | 10/1992 | Sanger | 711/5 |
| 5,389,965 A | * | 2/1995 | Kuzma | 348/14 |
| 5,404,446 A | * | 4/1995 | Bowater et al. | 395/511 |
| 5,434,678 A | * | 7/1995 | Abecassis | 386/52 |
| 5,537,157 A | * | 7/1996 | Washino et al. | 348/722 |
| 5,539,448 A | * | 7/1996 | Verhille et al. | 348/6 |
| 5,581,703 A | * | 12/1996 | Baugher et al. | 709/225 |
| 5,585,839 A | * | 12/1996 | Ishida et al. | 348/15 |
| 5,596,581 A | * | 1/1997 | Saeijs et al. | 370/394 |
| 5,611,038 A | * | 3/1997 | Shaw et al. | 345/302 |
| 5,647,834 A | * | 7/1997 | Ron | 600/23 |
| 5,706,290 A | * | 1/1998 | Shaw et al. | 370/465 |
| 5,822,524 A | * | 10/1998 | Chen et al. | 709/203 |
| 5,822,537 A | * | 10/1998 | Katseff et al. | 709/231 |
| 5,854,887 A | * | 12/1998 | Kindeu et al. | 348/7 |

\* cited by examiner

Primary Examiner—B. James Peikari
(74) Attorney, Agent, or Firm—Fitzpatrick, Cella, Harper & Scinto

(57) ABSTRACT

An information processing apparatus connected to a network to which plural information processing units are connected, in order to enable variation of the image frame rate in a specified information processing apparatus, thereby displaying a watched image in a smoother manner or decreasing the frame rate of unwatched images to increase the frame rate of another image. The information processing apparatus comprises a configuration for recognizing an instruction for varying the amount of image data released from an arbitrary one among the plural information processing apparatus and controlling the amount of image data released from the arbitrary information processing apparatus according to the recognition.

15 Claims, 26 Drawing Sheets

VIDEO TRANSMITTING SIDE

VIDEO RECEIVING SIDE

US 6,549,948 B1

VARIABLE FRAME RATE ADJUSTMENT IN A VIDEO SYSTEM

BACKGROUND OF THE INVENTION

1. Field of the Invention

The present invention relates to an information processing apparatus and a system therefor, for processing information containing at least image information.

2. Related Background Art

FIG. 10 shows an example of display in a conventional information processing apparatus.

There are illustrated image display frames 111 to 114 of the information processing apparatus; a control panel 101 including various buttons for operating the information processing apparatus; an image fast forward button 102; an image reproduction start button 103; an image reproduction reverse button 104; and an image reproduction stop button 105.

FIG. 8 is a block diagram of an information processing apparatus, constituting a terminal in the conventional system.

There are illustrated a ROM (Read Only Memory) 801 for storing programs for loading the operating system or the like into the information processing apparatus; a RAM (Random Access Memory) 802 serving as a work area in the execution of the operating system, programs or various data from an external memory device 808; a memory bus 803 for data exchange between the CPU (Central Processing Unit) and the ROM or RAM; a CPU 804; a CRT (Cathode Ray Tube) 809 serving as a display for displaying characters and images; an I/O bus 805 for data exchange between I/O devices such as keyboard, mouse and hard disk and the CPU; a keyboard 806 constituting an input device; a mouse 907 constituting a coordinate input device; an external memory device 808 such as a hard disk, for storage of the operating system, programs and data and for use as a swap device; and a VRAM 810 on which a bit map image of characters and images to be displayed on the CRT 809 is developed.

An image input unit 811 is connected to a video camera 902 to be explained later and an image analog signal entered from a CCD (Charge-Coupled Device) in the video camera 902 is converted into a digital signal and developed on a RAM in the image input unit 811.

The CPU 804 can read thus developed data through the I/O bus.

A voice input unit 812 is connected, like the image input unit 811, to the video camera 902, whereby an analog voice signal, entered from a microphone connected to the video camera 902, is converted into a digital signal and developed in the RAM in the voice input unit 812.

The CPU 804 can also read the above-mentioned data through the I/O bus.

A voice output unit (loudspeaker) 903 converts the digital voice data, stored in the RAM of the unit, into an analog signal for external release in the form of acoustic signal.

There are also provided an image compression/extension unit 813 for compressing and extending image and voice data; a network transmission/reception unit 814 for controlling a network; and a network channel 815.

FIG. 9 shows an example of the configuration of a conventional image processing system. An information processing apparatus 5 is basically same, in configuration, as apparatus 1 to 4, except for omission of units 902 and 903.

A main body 901 of the information processing apparatus incorporates the ROM 801, the RAM 802, the memory bus 803, the CPU 804, the VRAM 810, the I/O bus 805, the external memory device 808 and the network transmission/reception unit 814. There are also provided, as explained in the foregoing, the CRT 809 constituting the display for displaying the characters and images of the information processing apparatus; the keyboard 806 for entering characters or instructing operations; the mouse 807 constituting the coordinate input means; the video camera 902 for entering image and voice; the microphone/loudspeaker 903 for voice input/output; and the bus-structured network 815 such as Ethernet.

Windows 111 to 114 in FIG. 10 shows an example of display of the information processing apparatus 5 and display the images from the video cameras 902 connected to the information processing apparatus 1 to 4.

The voice entered from the microphones attached to the video camera 902 are released from the loudspeakers 903 associated with the information processing apparatus.

The information processing apparatus 1 to 4 broadcast the images from the video cameras to the network 815, but the efficiency of transmission will be deteriorated because of mutual collisions in case of simultaneous transmissions by the information processing apparatus 1 to 4, as the data amount becomes excessively large in comparison with the line capacity of the network 815.

For this reason, transmission control is conducted by the information processing apparatus 5, in the manner to be explained in the following with reference to FIG. 11.

It is registered in advance, in the information processing apparatus 5, that the system is constituted by the information processing apparatus 1 to 4.

When the transmission control is initiated according to a program of the ROM 801 and under the control of the CPU 804 in the information processing apparatus 5 (step 1101), the apparatus 5 sets a variable Count, for setting the information processing apparatus for which the data transmission is permitted, to "1" (step 1102). Then the information processing apparatus 5 transmits a transmission permission packet, for permitting the transmission of image and sound data of a frame, to an information processing apparatus corresponding to the value of the Count (step 1103). Then there is awaited the completion of transmission by the information processing apparatus corresponding to the value of the Count, to which the permission for transmission has been given (step 1104). The completion of transmission is identified by the reception of a transmission end packet, transmitted from the information processing apparatus corresponding to the value of the Count, to which the permission for transmission has been given. Then the Count is increased by a step to give the permission for transmission to a next information processing apparatus (step 1105). Then the value of the Count is compared with 4, and, if it is larger than 4, (step 1106), it is set at "1" as such value exceeds the maximum number of the information processing apparatus constituting the system of the present example (step 1101). If the value of the Count does not exceed 4 (step 1106), a transmission permission packet is transmitted (step 1103) to an information processing apparatus corresponding to the value of the Count.

Now there will be explained the transmission of the image and voice data, with reference to FIGS. 3 and 8. The image data obtained from the camera are read from the RAM in the image input unit 811, and the voice data are read from the RAM in the voice input unit (step 302). The image data are compressed in the image compression unit 813 (step 303), then the compressed image data and the voice data are connected and are formed into packets (step 304). Then, in response to the permission for transmission from the information processing apparatus 5 (step 305), all the generated packets are transmitted in succession to the network 815 (step 307). Subsequently a transmission end packet, indicating the completion of transmission, is transmitted to the information processing apparatus 5 which effects the transmission control (step 308), and the sequence returns to the step 302.

In the following explained is the reception of the image and voice data, with reference to FIGS. 4 and 8.

At first there is awaited the reception of the image and voice packet (step 402). When an image packet is received, the source of transmission of the packet is discriminated (step 404), and data are taken out from the packet (step 405). Then there is discriminated whether the image and voice data of an image frame have been collected (step 406), and, if not, there is awaited the reception of another image and voice packet (step 402). When the image and voice data of an image frame have been collected, there is conducted generation of the image and voice data. As the image data are compressed, they are extended in the image compression/extension unit 813 (step 407). Then the image data are stored in the RAM in the image input unit 811, and displayed in an area assigned for the information processing apparatus of the source of transmission. Also the voice data are stored in the RAM in the voice input unit 812, and the voice is released (step 408). Subsequently there is awaited the reception of a next image and voice packet (step 402).

In the following there will be explained, with reference to FIG. 12, a program for analyzing the content of the received packet and transferring the control to a suitable program according to thus analyzed content. At first there is awaited the reception of a packet (step 1202). When a packet is received, the header thereof is analyzed, and, if it is an image packet (step 1203), the sequence proceeds from a step 1204 to a step 403 in FIG. 4. If the received packet is not an image packet, there is discriminated whether it is a transmission permission packet (step 1205), and, if so, the sequence proceeds from a step 1206 to a step 306. If not, there is executed another packet process (step 1207), and the packet reception is again awaited (step 1202).

In the above-explained configuration, the information processing apparatus 5 effecting the transmission control effects stepwise upcount of the variable Count, and transmits a permission for transmission of a frame to the information processing apparatus of a number corresponding to the value of the Count.

Consequently, the frame rate of the image transmitted by the plural information processing apparatuses constituting the network is always substantially same, and it is not possible to vary the frame rate in the receiving side of the image. Also, it is not possible to vary the frame rate among such plural information processing apparatuses.

On the other hand, for simultaneously displaying plural images on the display of an information processing apparatus, there is generally required a very large computing power because of the very large amount of information involved in the image. For this reason, it is difficult to display plural moving images respectively with the maximum frame rate.

However, among the plural images simultaneously displayed, the user usually pays attention only to one or two images, so that the computing power is wasted for other images. However, a simple lowering of the frame rate of the plural images in order to avoid such waste of the computing power results in deterioration of the quality of the displayed images, and such method is not effective as the displayed images become unpleasant to observe.

On the other hand, there may be a difference in the processing ability between the information processing apparatus of the transmitting side and that of the receiving side. For example, if the computing power of the receiving side is smaller than that of the transmitting side, the image display at the receiving side has to be made with a frame rate lower than that of the transmission. For this reason, in case plural computers with different computing powers are used in the image receiving side, the frame rate of the transmission has to be lowered in consideration of the computer of the lowest computing power, so that the computing powers of other computers cannot be fully exploited and the displayed images are deteriorated in quality.

SUMMARY OF THE INVENTION

In consideration of the foregoing, an object of the present invention is to provide an information processing apparatus and an information processing system, not associated with the drawbacks mentioned above.

Another object of the present invention is to provide an information processing apparatus and an information processing system, in which the frame rate of the image to be processed is rendered variable thereby achieving satisfactory image processing.

Still another object of the present invention is to provide an information processing apparatus and an information processing system, capable of satisfactory image processing according to the processing ability of respective information processing apparatus.

Still another object of the present invention is to provide an information processing apparatus capable of satisfactory image generation.

Still another object of the present invention is to provide an information processing apparatus and an information processing system, provided with novel functions.

Still other objects of the present invention, and the features thereof, will become fully apparent from the following detailed description, which is to be taken in conjunction with the attached drawings.

DETAILED DESCRIPTION OF THE PREFERRED EMBODIMENTS

First Embodiment

Figure 1:
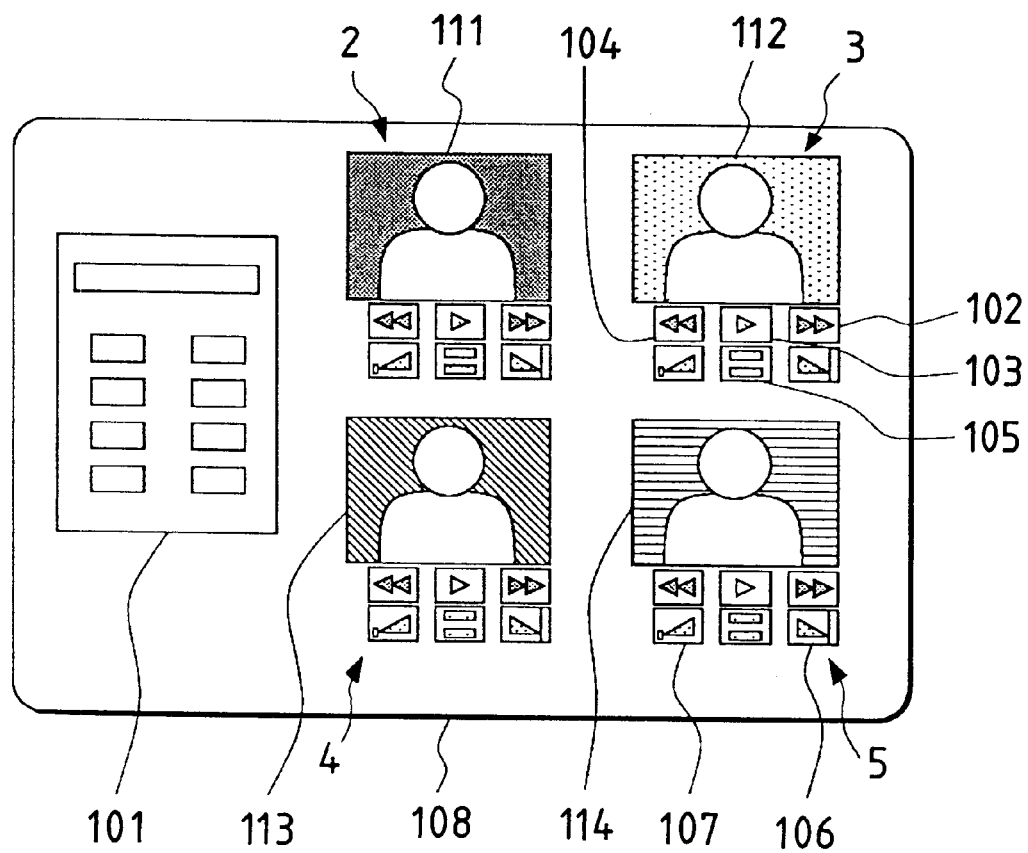
FIG. 1 is a view showing an example of display image frame of an information processing apparatus constituting embodiment of the present invention.
Figure 13:
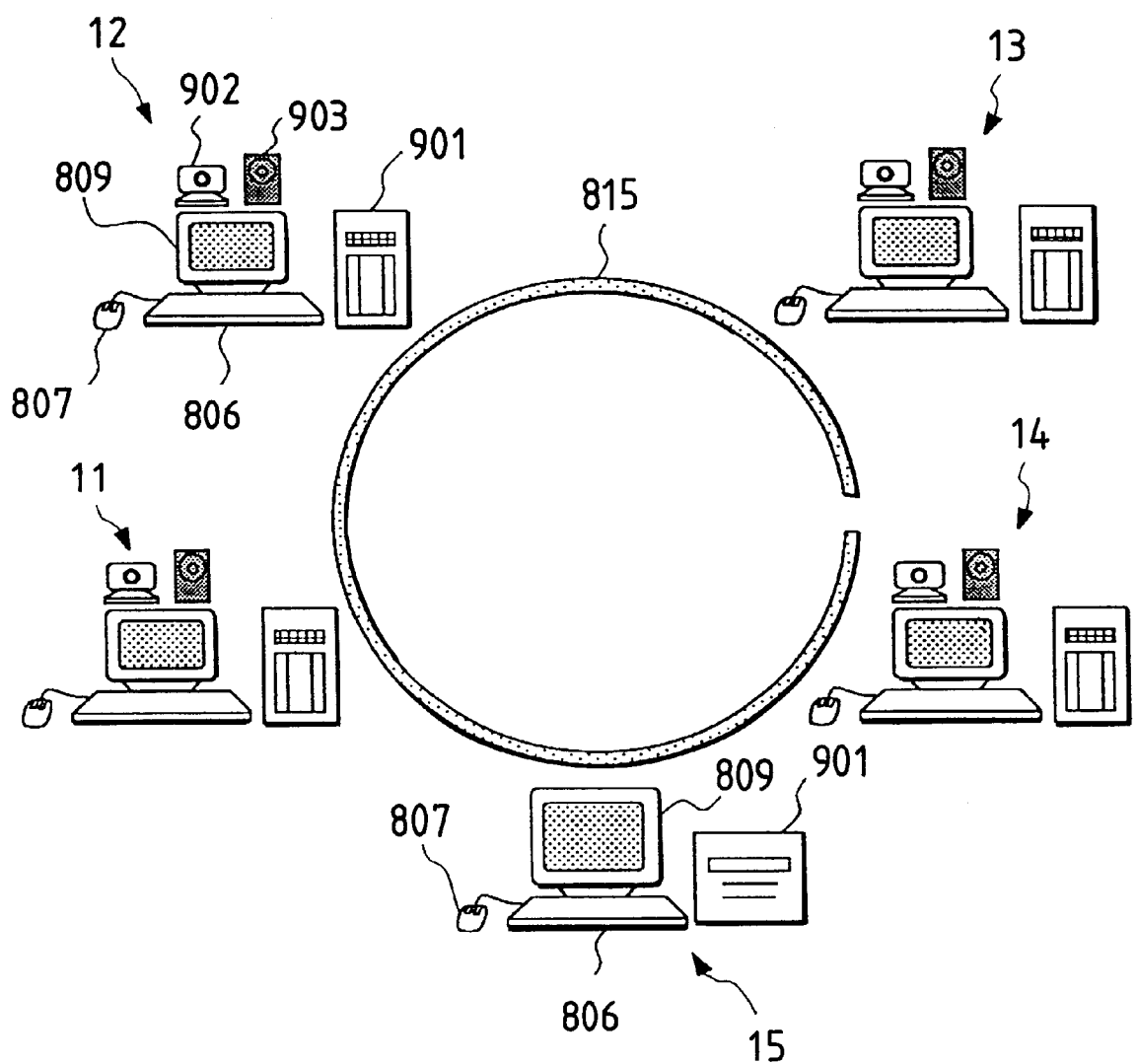
FIG. 13 is a view showing the configuration of an information processing system constituting a first embodiment.

FIG. 1 is a view showing an example of display image frame for information processing apparatus 11 to 14 of a first embodiment of the present invention, shown in FIG. 13.

Figure 10:
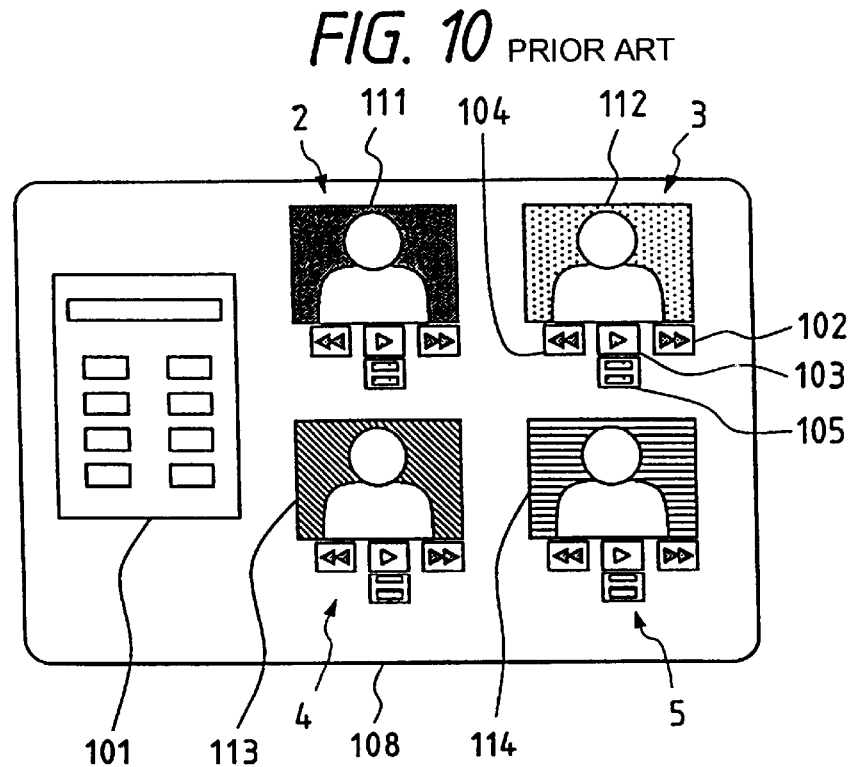
FIG. 10 is a view showing an example of display image frame of a conventional information processing apparatus.
Figure 11:
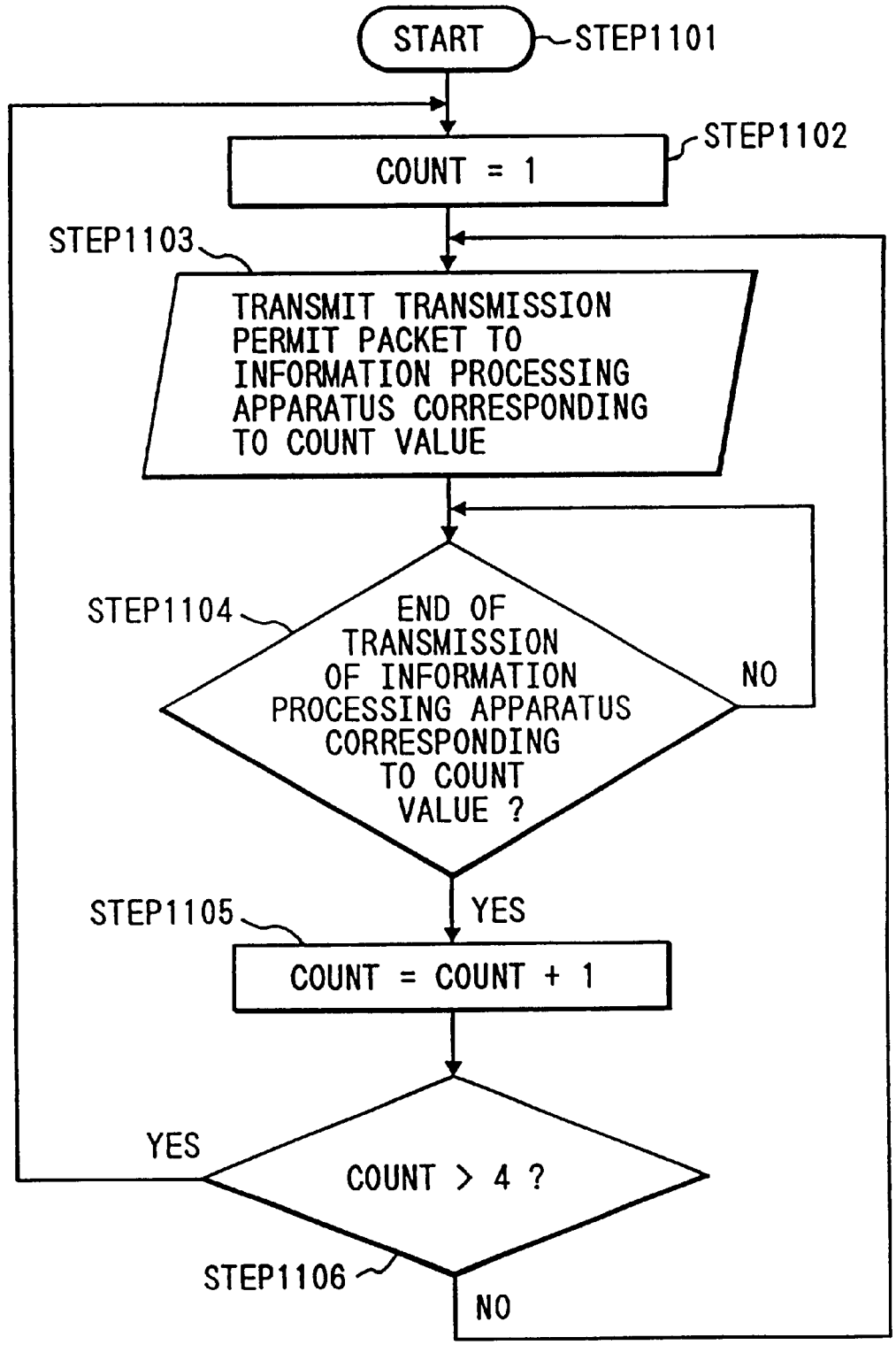
FIG. 11 is a flow chart of a conventional control sequence, in releasing a permission for transmission.
Figure 12:
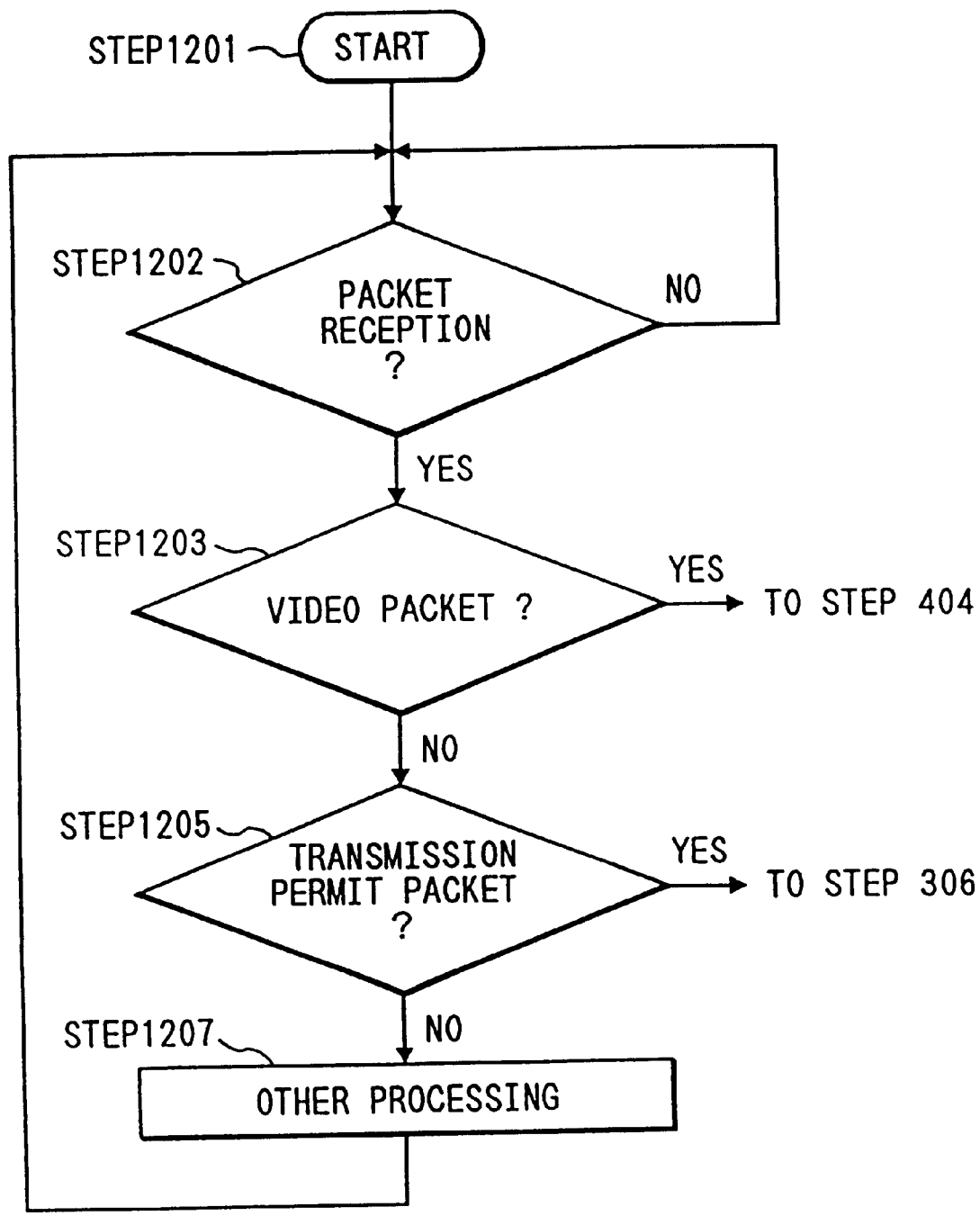
FIG. 12 is a flow chart of a conventional control sequence, in packet reception from the network 815.

There are provided a button 106 for requesting an increase in the image frame rate, and a button 107 for requesting a decrease in the image frame rate. Other components are same as those shown in FIG. 10.

Windows 111 to 114 in FIG. 1 respectively display images obtained from the video cameras 902 of the information processing apparatus 11 to 14. The voices entered from the microphones associated with the video cameras 902 are respectively released from the loudspeakers 903 attached to these information processing apparatus.

The information processing apparatus 11 to 14 broadcast the images from the video cameras to the network 815, but the efficiency of transmission becomes deteriorated because of the collisions on the network if the transmissions are made simultaneously by the information processing apparatus 11 to 14.

In the present embodiment, according to a request for a variation in the frame rate, sent from the information processing apparatus 11 to 14 shown in FIG. 13, the information processing apparatus 15 effects transmission control to vary the frame rate. This embodiment will be explained in the following with reference to the attached drawings. In the information processing apparatus 15 of the present embodiment, the program-storing ROM 801 of the conventional information processing apparatus 5 is replaced by a ROM 1801 capable of realizing the flow to be explained later.

Figure 2:
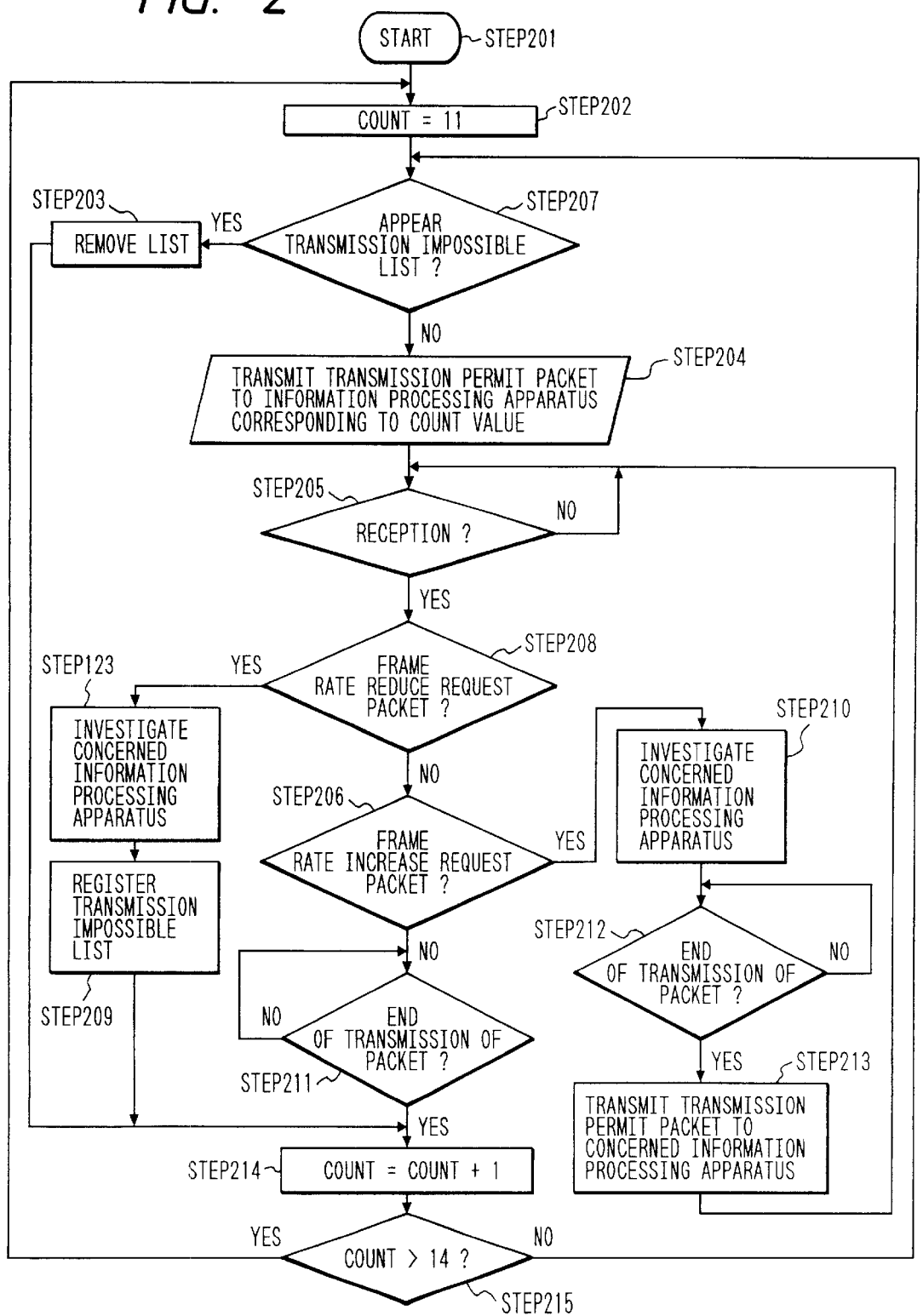
FIG. 2 is a flow chart of the control sequence of the information processing apparatus, in releasing a permission for transmission.

At first the function of the information processing apparatus 15, effecting the transmission control, will be explained with reference to FIG. 2. It is registered in advance, in the information processing apparatus 15, that the system is constituted by the information processing apparatus 11 to 14.

When the information processing apparatus 15 initiates transmission control according to the program stored in the ROM 1801 and under the control of the CPU 804 (step 201), a variable Count, for setting the information processing apparatus to which the transmission is to be permitted, is set at "11" (step 202). Then there is discriminated whether the information processing apparatus of a number corresponding to the value of the Count is included in a transmission inhibition list (step 207). If included, the apparatus is excluded from the list (step 203) and the sequence proceeds to a step 214. If not included, a transmission permission packet, permitting the transmission of image and voice data of a frame, is sent to the information processing apparatus of a number corresponding to the value of the Count (step 204). Then the reception of a packet from the network is awaited (step 205). Then the subsequently received packet is analyzed, and, if it is a packet requesting a decrease of the image frame rate (step 208), the information processing apparatus for which the image frame rate is to be decreased is identified (step 123), and the apparatus is registered on the transmission inhibition list (step 209). Then the sequence proceeds to the step 214.

Also if the received packet is identified as a packet requesting an increase of the image frame rate (step 206), the image processing apparatus for which the image frame rate is to be increased is identified (step 210). Then there is awaited the end of current transmission (step 212), and the transmission permission packet is transmitted to the information processing apparatus identified in the step 210 (step 213). Subsequently the sequence returns to the step 205.

On the other hand, if the received packet is not a packet requesting an increase of the image frame rate (step 206), there is awaited the end of the current image transmission (step 211) and the variable Count is increased by one (step 214). If the value of the Count exceeds 14 (step 215), which is the maximum number of the information processing apparatus constituting the system, the Count is set at "11"

(step 202). If the Count does not exceed 14 (step 215), the transmission permission packet is transmitted to the information processing apparatus of a number corresponding to the value of the Count (step 204).

In the present embodiment, the transmission and reception of the image and voice data are conducted in the same manner as in the conventional configuration.

In the following there will be explained, with reference to FIGS. 5 and 1, a procedure for issuing a request for increasing the image frame rate.

At first there is awaited the depression of the image frame rate increasing button shown in FIG. 1. When the button is depressed, the sequence proceeds to a step 503 in FIG. 5, for checking the value of a subtraction timer for preventing excessive issuances of the request for varying the image frame rate (step 506), and, if the value is not 0, there is again awaited the depression of the button (step 502). When the value of the subtraction timer reaches 0, the packet requesting an increase in the image frame rate is transmitted (step 507). Then a suitable predetermined value is set in the subtraction timer and the timer is started (step 508), and there is awaited again the depression of the image frame rate decreasing button (step 502). The above-mentioned subtraction timer is so constructed, upon reaching 0, to inhibit the entry of the request for an increase of the image frame rate and to transmit the image frame rate increasing packet.

Figure 6:
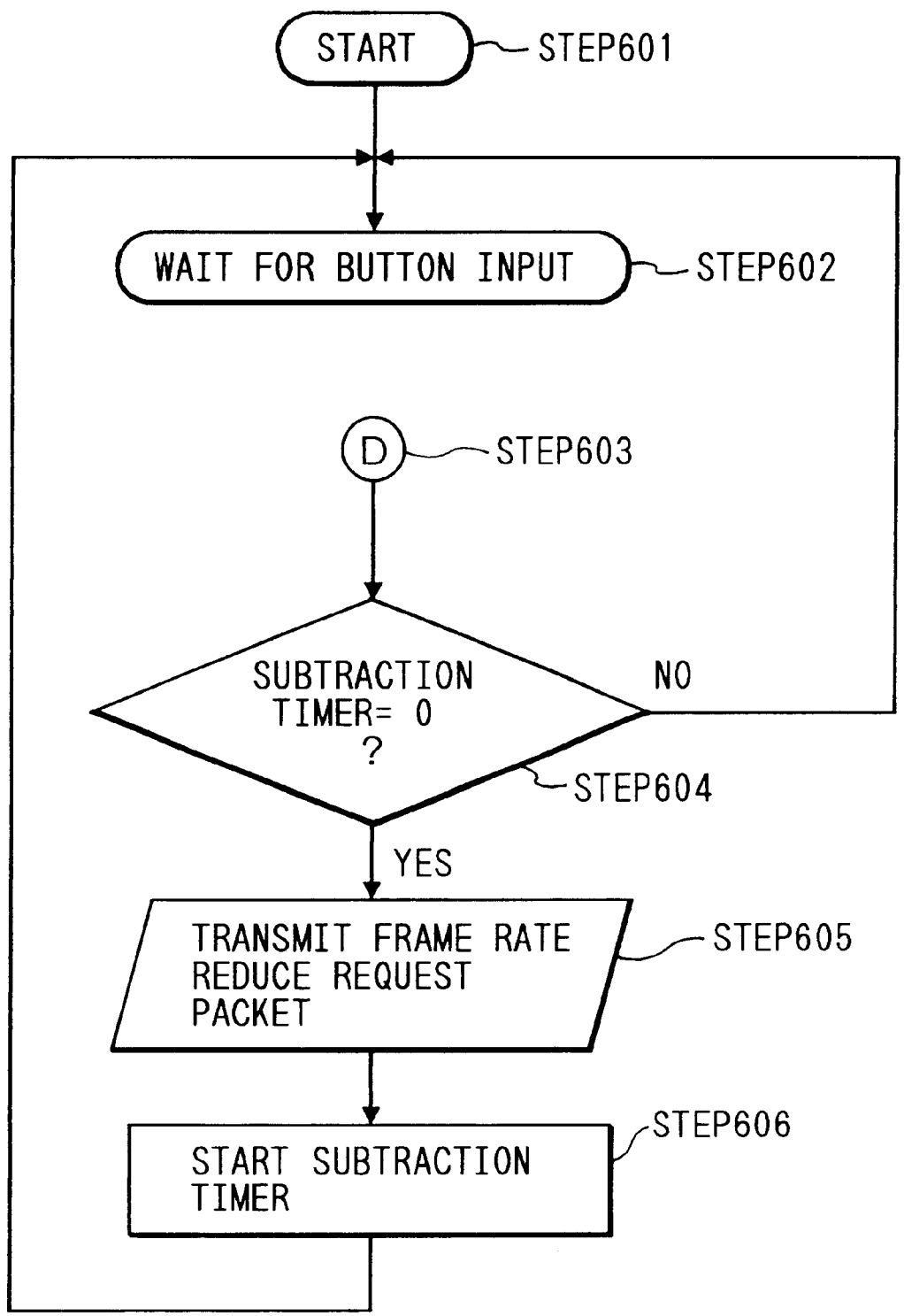
FIG. 6 is a flow chart of the control sequence, in releasing a request for decreasing the image frame rate.

Now there will be explained, with reference to FIGS. 6 and 1, a procedure for issuing a request for decreasing the image frame rate. This procedure is similar to that for issuing a request for increasing the image frame rate.

At first there is awaited the depression of the image frame rate decreasing button shown in FIG. 1. When the button is depressed, the sequence proceeds to a step 603 in FIG. 6, and there is checked the value of a subtraction timer for preventing excessive issuances of the request for varying the image frame rate (step 606), and, if the value is not 0, there is again awaited the depression of the button (step 602). When the value reaches 0, the packet requesting a decrease in the image frame rate is transmitted (step 605). Then a suitable predetermined value is set in the subtraction timer and the timer is started (step 608), and there is awaited again the depression of the image frame rate decreasing button (step 602).

Figure 7:
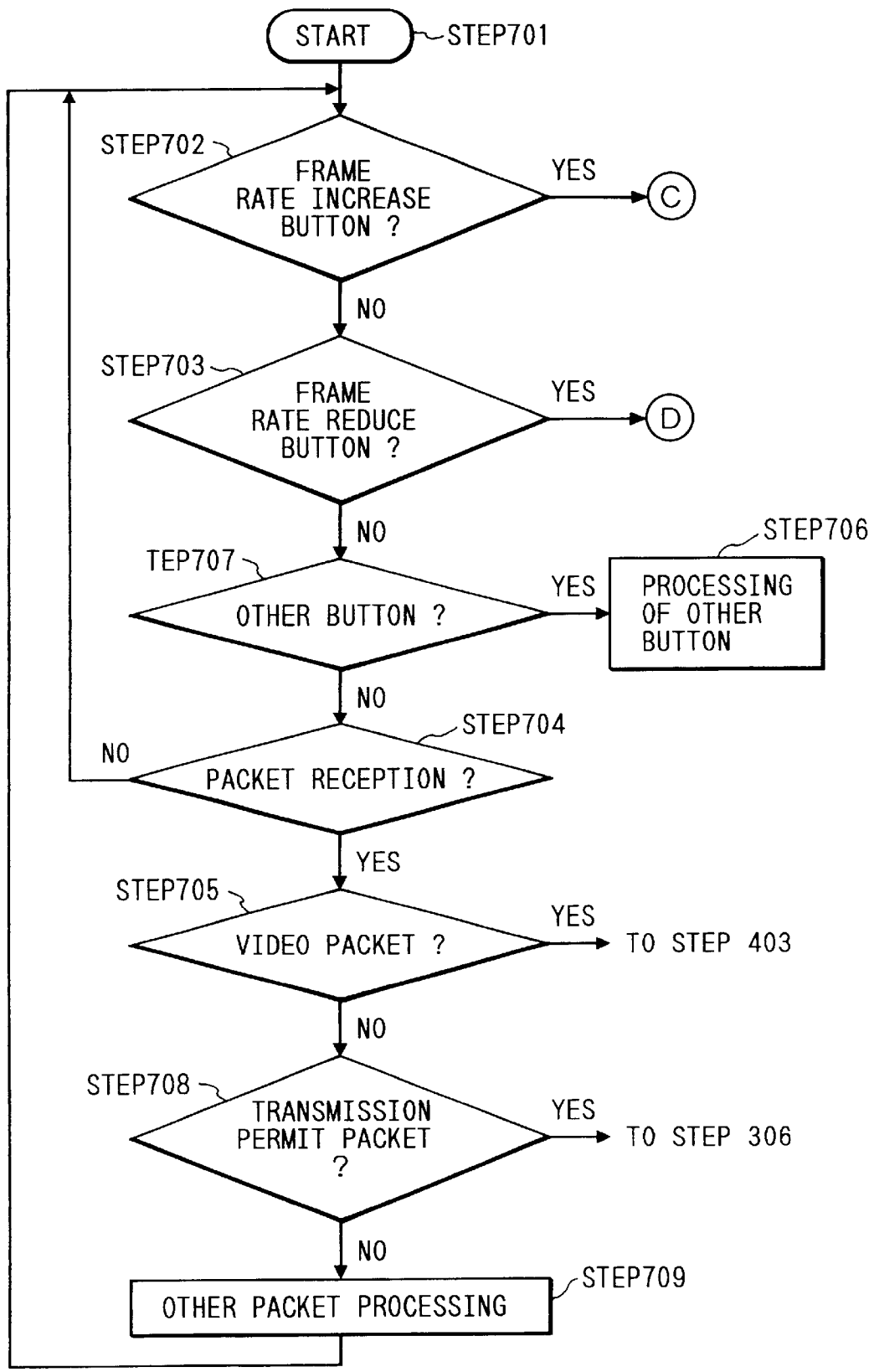
FIG. 7 is a flow chart of the control sequence in case of packet reception from the network 815.
Figure 8:
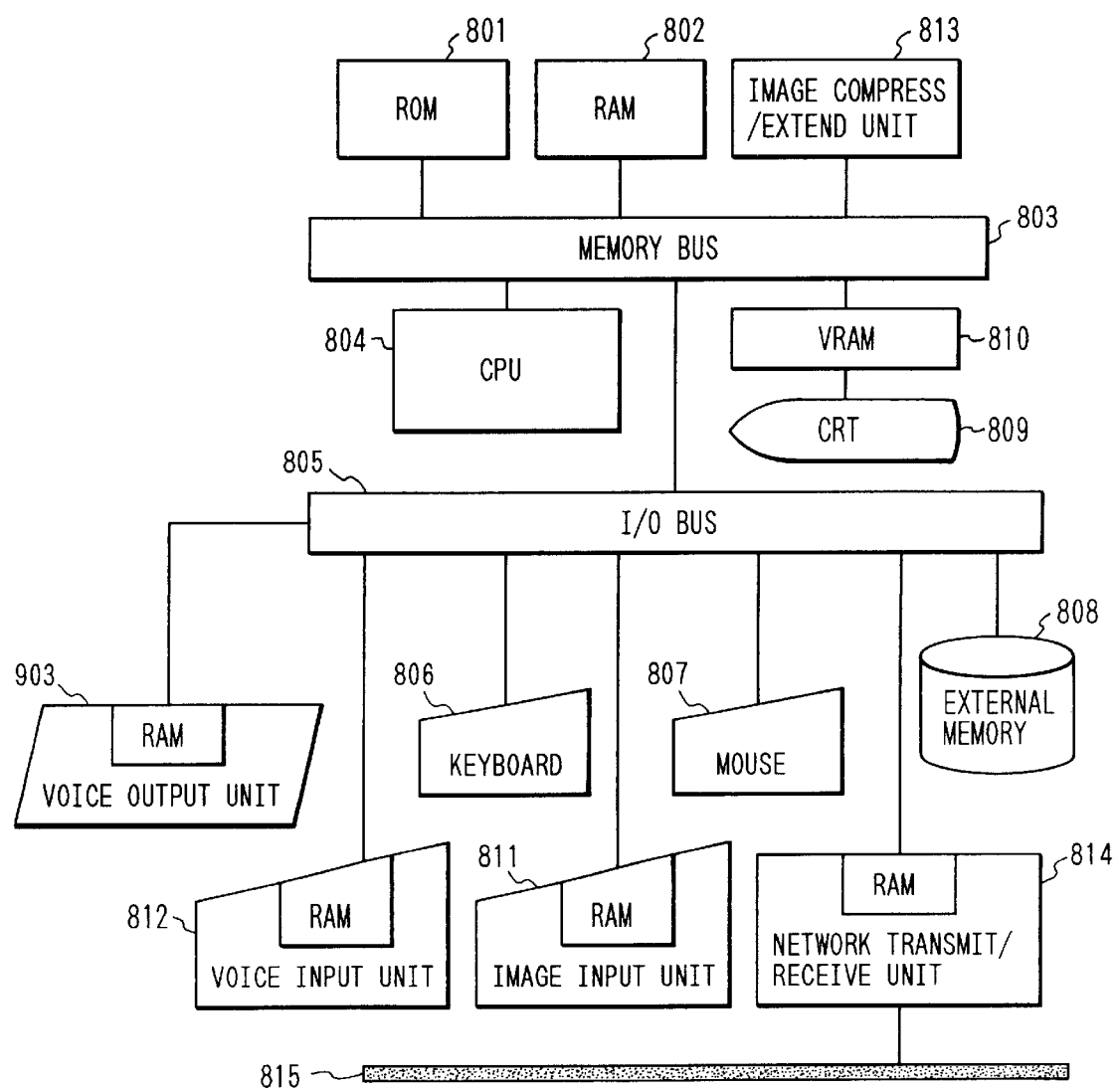
FIG. 8 is a block diagram of an information processing apparatus constituting an embodiment of the present invention.
Figure 9:
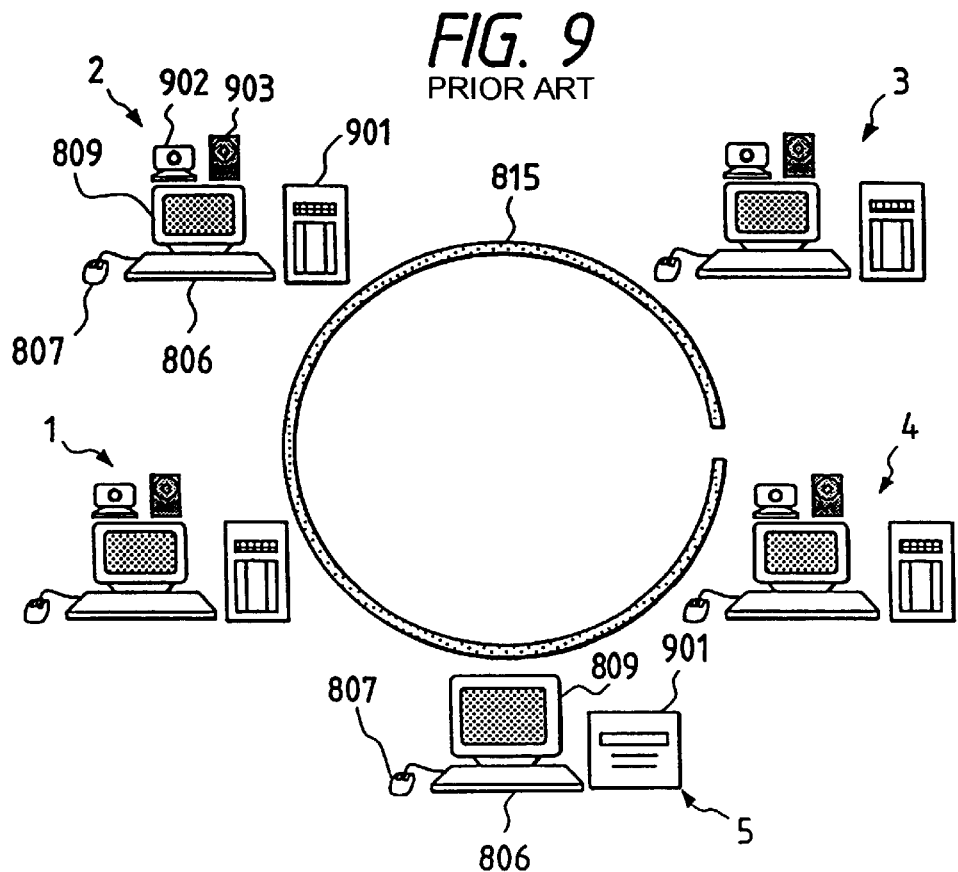
FIG. 9 is a view showing the configuration of a conventional information processing system.

In the following there will be explained, with reference to FIG. 7, a program for transferring the control to a suitable program in case any button in FIG. 1 is depressed or according to the content of the received packet.

Figure 3:
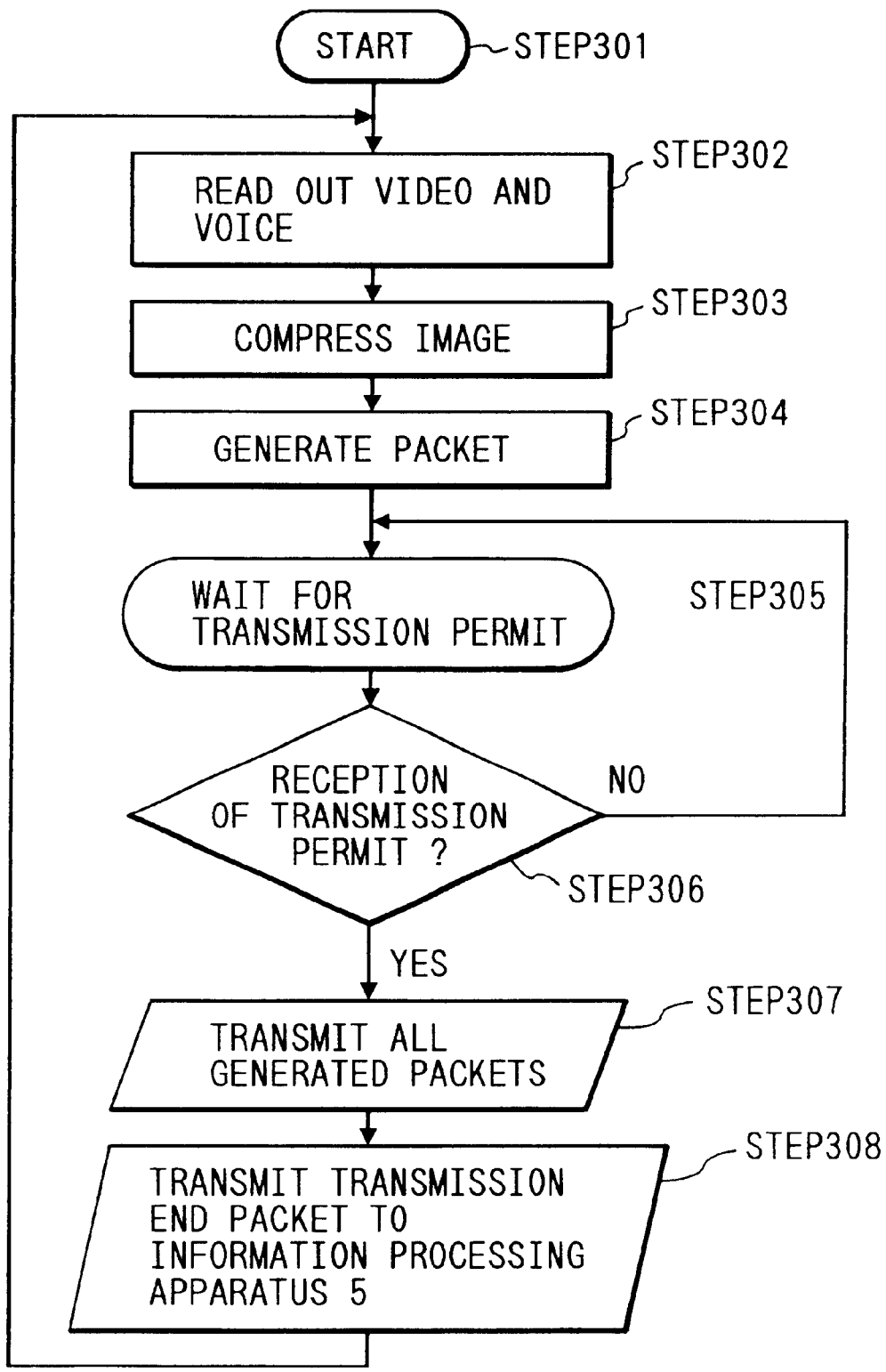
FIG. 3 is a flow chart of the control sequence in releasing an image, from the video camera 902, to the network 81
Figure 4:
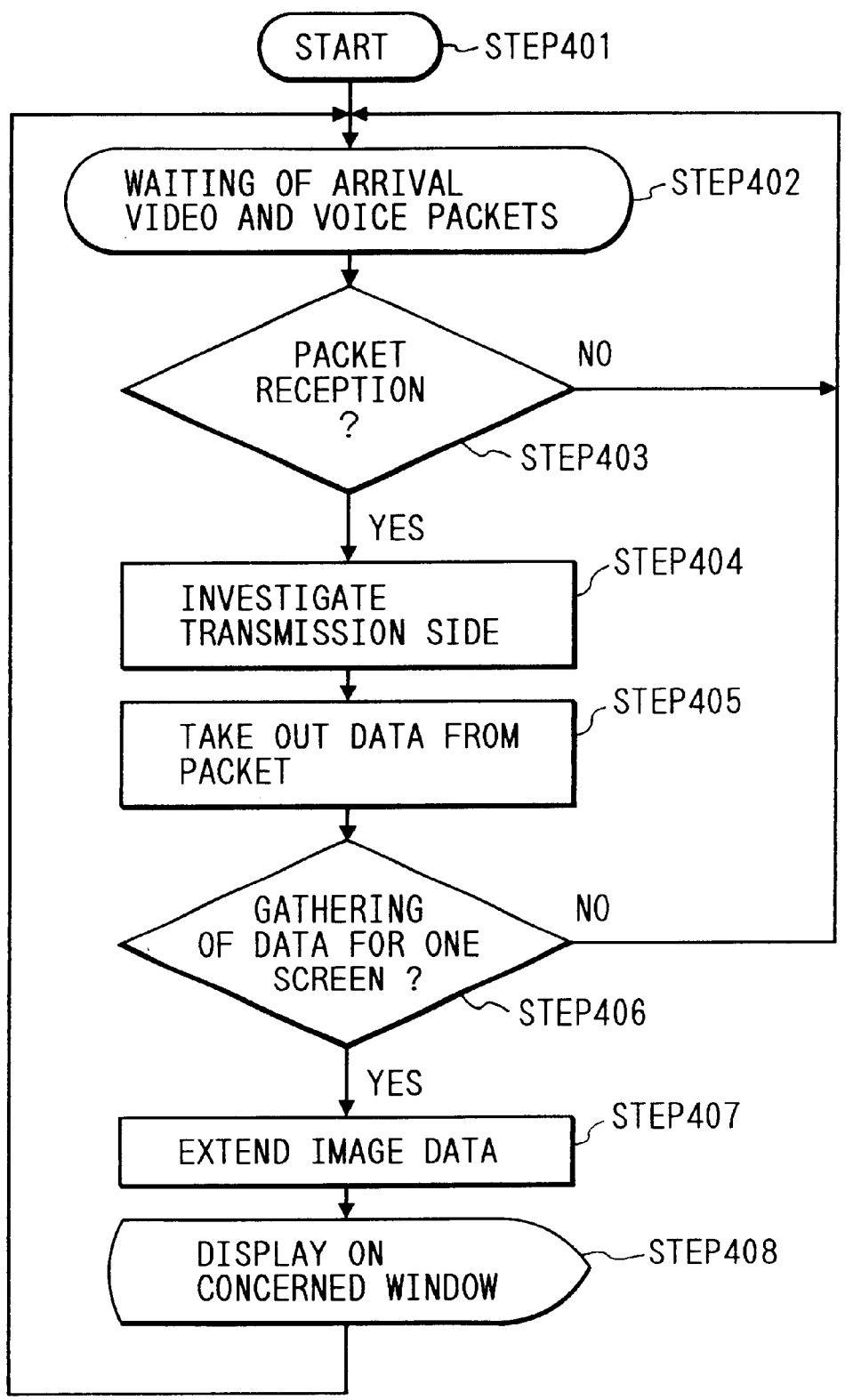
FIG. 4 is a flow chart of the control sequence, in displaying an image transmitted through the network 815.
Figure 5:
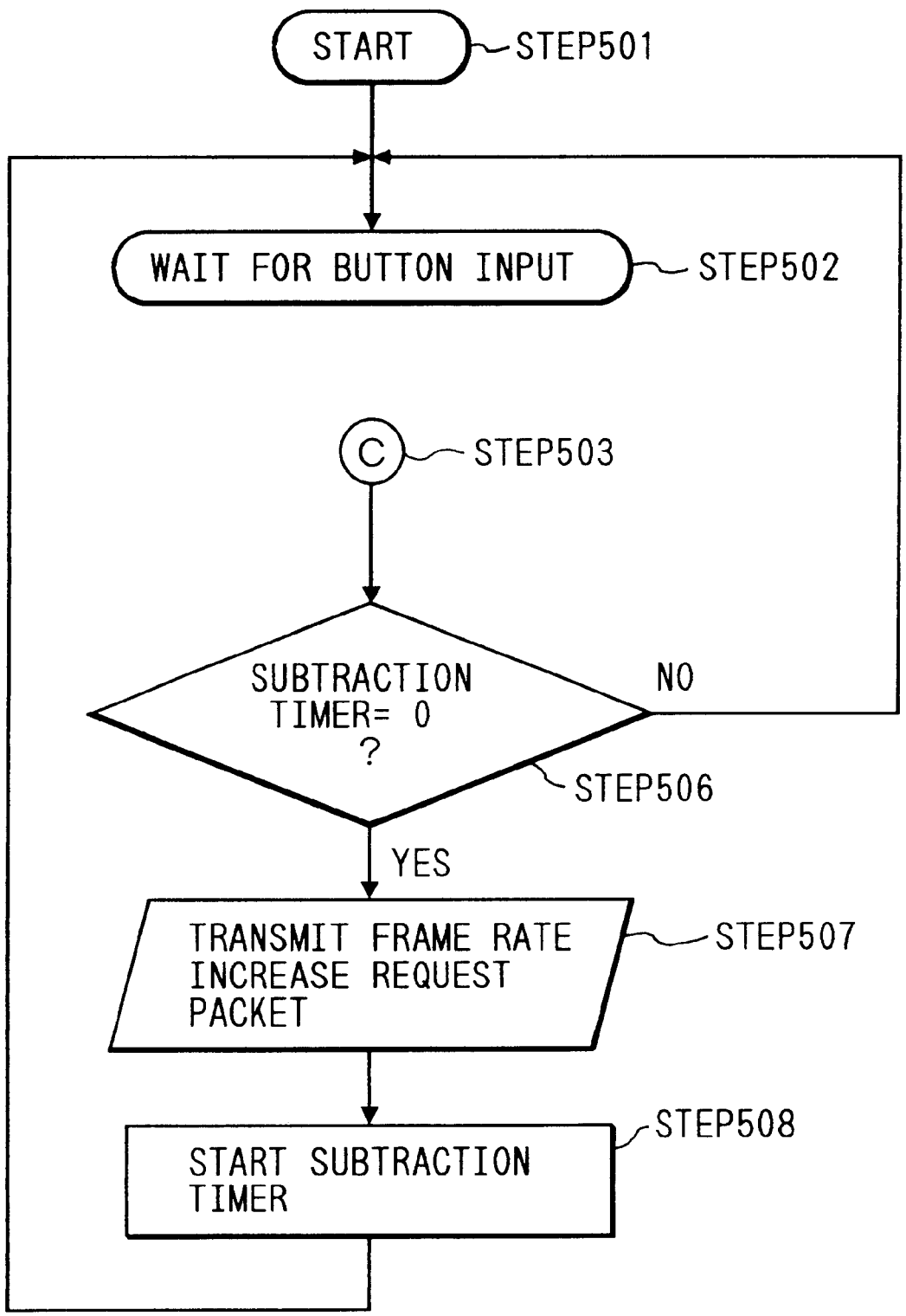
FIG 5 is flow chart of the control sequence, in releasing a request for increasing the image frame rate.

At first there is discriminated whether the image frame rate increasing button has been depressed (step 702), and, if depressed, the sequence proceeds to the step 503 in FIG. 5. Then there is discriminated whether the frame rate decreasing button has been decreased, and, if depressed, the sequence proceeds to the step 603 in FIG. 6. If any other button has been depressed (step 707), there is executed a suitable button process (step 706). Then there is discriminated whether a packet has been received (step 704), and, if not, there is again discriminated whether the image frame rate increasing button has been depressed (step 702). If a packet has been received, the header of the packet is analyzed (step 705), and, if the received packet is an image packet, the sequence proceeds to the step 403 in FIG. 4. If it is not an image packet, there is discriminated whether it is a transmission permission packet (step 708), and, if so, the sequence proceeds to the step 306 in FIG. 3. If not, there is executed a suitable packet process (step 709), and there is again discriminated whether the image frame rate increasing button has been depressed (step 702).

In the embodiment explained above, in response to the continued depression of the image frame rate increasing button 106 in FIG. 1, requests for increasing the image frame rate are issued repeatedly and in response the information processing apparatus effecting the transmission control continues to transmit the transmission permission packets, whereby the frame rate of the information processing apparatus which has issued the request for increasing the frame rate can be increased.

Also in response to the continued depression of the image frame rate decreasing button 107 in FIG. 1, requests for decreasing the image frame rate are issued repeatedly and in response the information processing apparatus effecting the transmission control skips the permission for transmission for the information processing apparatus which has used the request for decreasing the frame rate, whereby the image frame rate can be lowered as a result.

It is also possible to stop the image from an information processing apparatus by decreasing the set value of the subtraction timer and increasing the frequency of transmissions of the frame rate decreasing requesting packet, as the information processing apparatus effecting the transmission control always skips the permission for transmission for the first-mentioned information processing apparatus.

As explained in the foregoing, in a system for effecting image input and display by mutual transmission of image information among plural information processing apparatus, for the purpose of effecting control by one or more of the plural information processing apparatus on the apparatus which effects image transmission so as to maintain the amount of image information within the network at a certain level, the present embodiment is provided with means for requesting a change in the frame rate of the image transmitted by a specified information processing apparatus and means for causing the information processing apparatus effecting the transmission control, in response to the request, to vary the amount of image transmission to the information processing apparatus for which the change in the image frame rate is requested. It is thus rendered possible to vary the image frame rate of any information processing apparatus, thereby enabling to observe an image of interest in smoother manner or to decrease the frame rate of an unwatched image and to increase the frame rate of other images.

In the above-explained embodiment the processed images are entered from the video cameras, but the present invention is applicable also to a case where the video signals are transmitted from video servers as long as there is an information processing apparatus which controls transmission of plural information processing apparatus serving as video servers.

In the present embodiment, the request for varying the frame rate is made by an information processing apparatus belonging to the system, but it may also be made by an information processing apparatus outside the system.

As explained in the foregoing, the present embodiment provides an information processing apparatus which is connected to a network connected to plural information processing apparatus and which is provided with recognition means for recognizing an instruction for varying the amount of image data released from any of the plural information processing apparatuses and control means for controlling the amount of image data released by the information processing apparatuses according to the recognition, whereby the amount of released image data is rendered variable for each of the information processing apparatus connected to the network and the image released from a desired information processing apparatus alone can be processed with a larger amount of image data.

Second Embodiment

In the following a second embodiment of the present invention will be explained with reference to the attached drawings.

Figure 14:
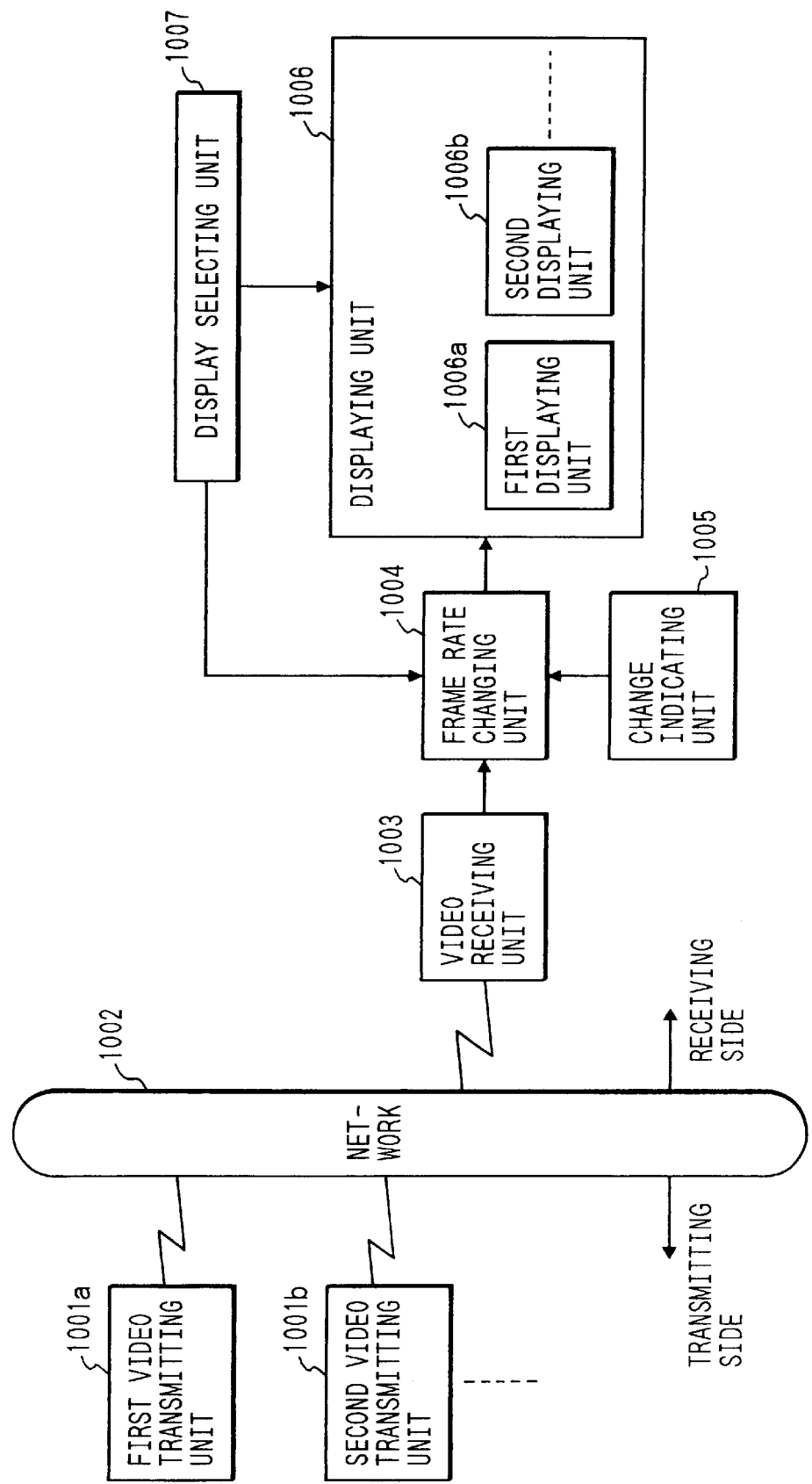
FIG. 14 is a schematic block diagram showing the features of a second embodiment.

FIG. 14 is a functional block diagram showing the features of an information processing system of the second embodiment.

Referring to FIG. 14, the image data transmitted from a first image transmitting unit 1001a of the transmitting side to a network 1002 are received by an image receiving unit 1003 of the receiving side.

The image received by the image receiving unit 1003 is displayed on a display unit 1006, with a frame rate controlled by a frame rate varying unit 1004, which arbitrarily varies the display frame rate of the received image according to an instruction from a variation indicating unit 1005. The frame rate varying unit 1004 and variation indicating unit 1005 are composed of a main memory device 1022, a mouse 1023 and a CPU 1024 shown in FIG. 16 and serving as the frame rate varying means of the present embodiment.

Consequently, if the computing power of the computer of the receiving side is equal to or larger than that of the computer of the transmitting side, the variation indicating unit 1005 is caused to give an instruction to the frame rate varying unit 1004 to increase the display frame rate, whereby the received image can be displayed with a frame rate as high as the transmission frame rate of the first image transmitting unit 1001a. Also in case the computing power of the receiving side is lower than that of the transmitting side, the display frame rate is similarly lowered whereby the received image can be displayed with a frame rate matching the computing power of the receiving side.

Also in case image data are simultaneously transmitted to the network 1002 from plural image transmitting units 1001a, 1001b, . . . , these image data are received by the image receiving unit 1003 and respective display frame rates are controlled by the frame rate varying unit 1004. Thus the received images are simultaneously displayed on the first display unit 1006a, second display unit 1006b, . . . , In such case the frame rate control by the frame rate varying unit 1004 is conducted according to the selection of one of the first display unit 1006a, second display unit 1006b, . . . , by the display selection unit 1007. More specifically the display selection unit 1007 selects arbitrary one of the plural display units 1006a, 1006b, . . . , and the frame rate varying unit 1004 selects a higher frame rate for the received image to be displayed on the display unit selected by the display selection unit 1007 and a lower frame rate for the received images to be displayed on other display units.

Consequently, by selecting, with the display selection unit 1007, a display unit which displays the image of interest to the user, such image alone can be displayed with a higher frame rate and other unwatched images can be displayed with a lower frame rate. It is therefore rendered possible to avoid wasting of much computer power to the images unimportant to the user and to spend sufficient computing power to attain high image quality only for the image of interest to the user.

The information processing apparatus of the present embodiment is constituted by the image receiving unit 1003, the frame rate varying unit 1004, the variation indicating unit 1005, the display unit 1006 and the display selection unit 1007 mentioned above.

In the following there will be explained another embodiment.

This embodiment is to provide a configuration allowing to varying the frame rate at the receiving side, in case an image transmitted from an information transmitting apparatus is received and display by one or plural information processing apparatuses.

Figure 15:
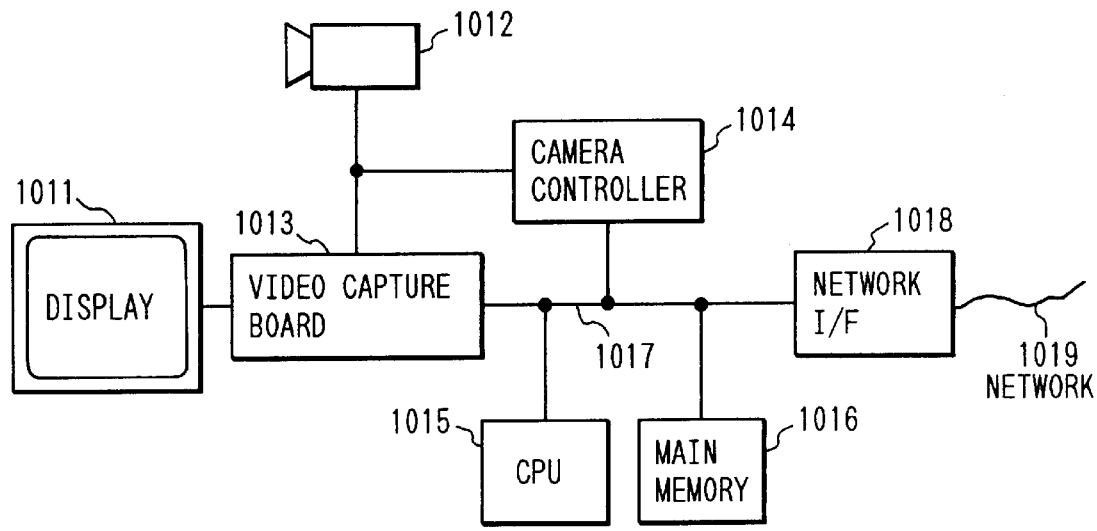
FIG. 15 is a view showing the hardware configuration of the image transmitting side for realizing the image communication system of the second embodiment.
Figure 16:
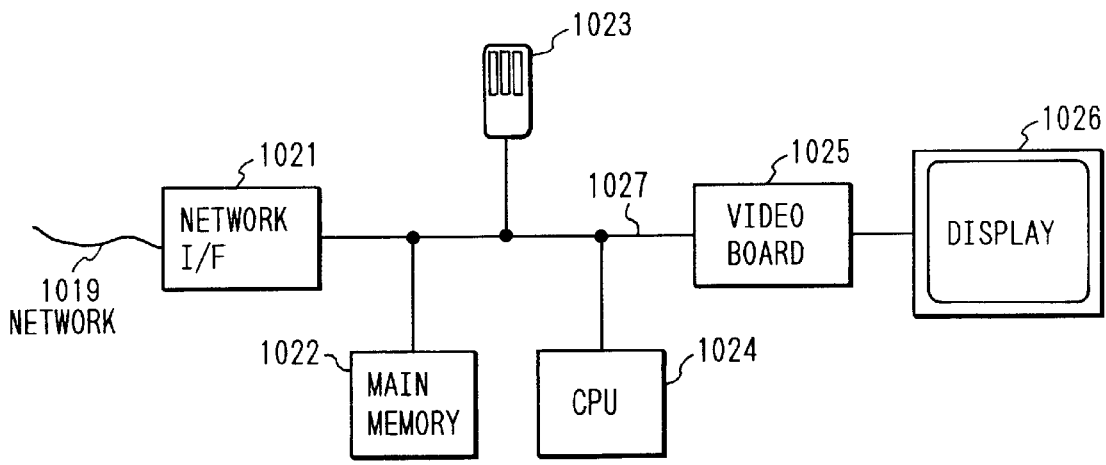
FIG. 16 is a view showing the hardware configuration of the image receiving side for realizing the image communication system of the second embodiment.

FIGS. 15 and 16 respectively show an example of the hardware configurations of the transmitting and receiving sides of the present embodiment.

In the image transmitting side shown in FIG. 15, the image taken with a camera 1012 is fetched, for every frame, through a video capture board 1013 and is temporarily stored in a main memory device 1016. The image data stored therein are transmitted, through a network interface 1018, to a network 1019. The function of the camera 1012 is controlled by a camera controller 1014.

The above-mentioned image taken by the camera 1012 is also supplied to and displayed on a display device 1011 through the video capture board 1013. The display 1011 can be composed, for example, of a CRT or a liquid crystal display unit. The above-mentioned components are mutually connected by an internal bus 1017 and are controlled by a CPU 1015.

In the image receiving side shown in FIG. 16, the image data transmitted from the transmitting side through the network 1019 are received by a network I/F 1021 and temporarily stored in a main memory device 1022. The image data stored therein are supplied, frame by frame, to and displayed on a display unit 1026 through a video board 1025.

The display 1026 displays, in addition to the image itself, GUI (graphical user interface) parts, such as a scroll bar, which can be operated with a mouse 1023 for user interfacing. The above-mentioned scroll bar is provided for arbitrarily setting the frame rate of the received image data. The above-mentioned components are mutually connected by an internal bus 1027 and are controlled by a CPU 1024.

In the following there will be explained the configuration for setting the frame rate at the image receiving side. It is assumed that the image transmitting side lacks any mechanism for controlling the timing of image transmission and effects the image transmission with a maximum frame rate, with a frame interval TR.

Figure 17:
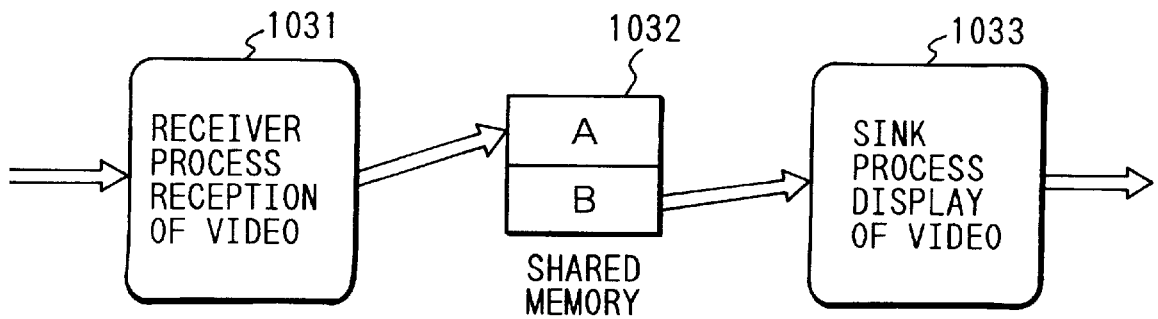
FIG. 17 is a view showing the process configuration of a software for image reception and display in the second embodiment.

FIG. 17 shows the process configuration of the software for image reception and display. The present embodiment effects image reception and display, utilizing a RECEIVER process 1031 and a SINK process 1033. These processes are realized by the CPU 1024, shown in FIG. 16, by controlling the network I/F 1021, mouse 1023, video board 1025 and display 1026 according to a program stored in the main memory device 1022.

The RECEIVER process 1031 exclusively effects image reception, while the SINK process 1033 exclusively effects image display. These two processes exchange image data through a common memory 1032. More specifically, the RECEIVER process stores the image data, received from the network I/F 1021, in the common memory 1032, and the SINK process 1033 reads the image data from the common memory 1032 and displays the image data on the display 1026.

The common memory 1032 is secured as a temporary buffer in the main memory device 1022 and functions as a ring buffer with a size of two frames of image data. Thus, while the RECEIVER process 1031 stores the received image data in a first area A of the common memory 1032, the SINK process 1033 read the image data from a second area B of the common memory 1032. Also while the RECEIVER process 1031 stores the image data in the second area B of the common memory 1032, the SINK process 1033 read the image data from the first area A.

Thus the RECEIVER process 1031 writes the image data in the common memory 1032 in the order of the first area A, second area B, first area A, second area B, . . . , and the SINK process 1033 reads the image data in the order of the second area B, first area A, second area B, first area. . . . Consequently the storage in the RECEIVER process 1031 and the read-out in the SINK process 1033 can be conducted in parallel manner.

Figure 18:
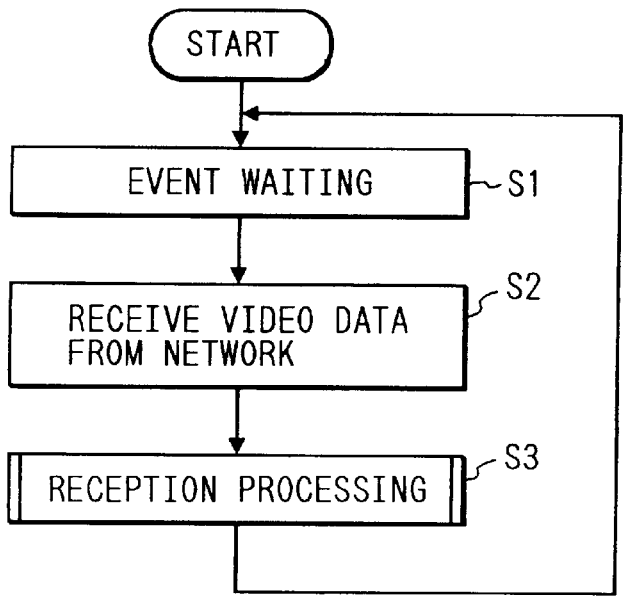
FIG. 18 is a flow chart of the control sequence of a receiver process.
Figure 19:
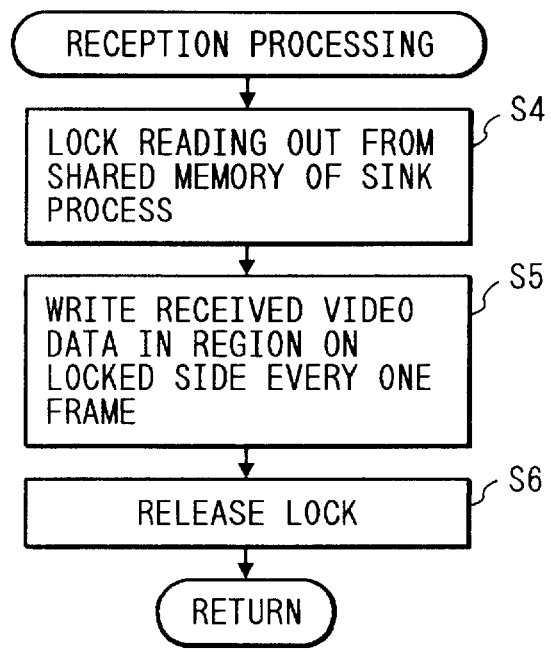
FIG. 19 is a flow chart of the control sequence of a receiver process.

FIGS. 18 and 19 show the sequence of the RECEIVER process 1031.

Referring to FIG. 18, at first a step S1 awaits occurrence of an event. Then, when a step S2 receives the image data transmitted through the network 1019 with an interval TR, a step S3 effects a reception process shown in FIG. 19.

Referring to FIG. 19, in a step S4, the RECEIVER process 1031 locks either of the first area A and the second area B of the common memory 1032 so as to inhibit the access by the SINK process 1033. Then a step S5 stores the image data of a frame, received from the transmitting side, in the locked area of the common memory 1032. Finally, a step S6 releases the lock, set in the step S4, after the lapse of a predetermined time. The above-explained process is repeated alternately for the first area A and the second area B of the common memory 1032.

Figure 20:
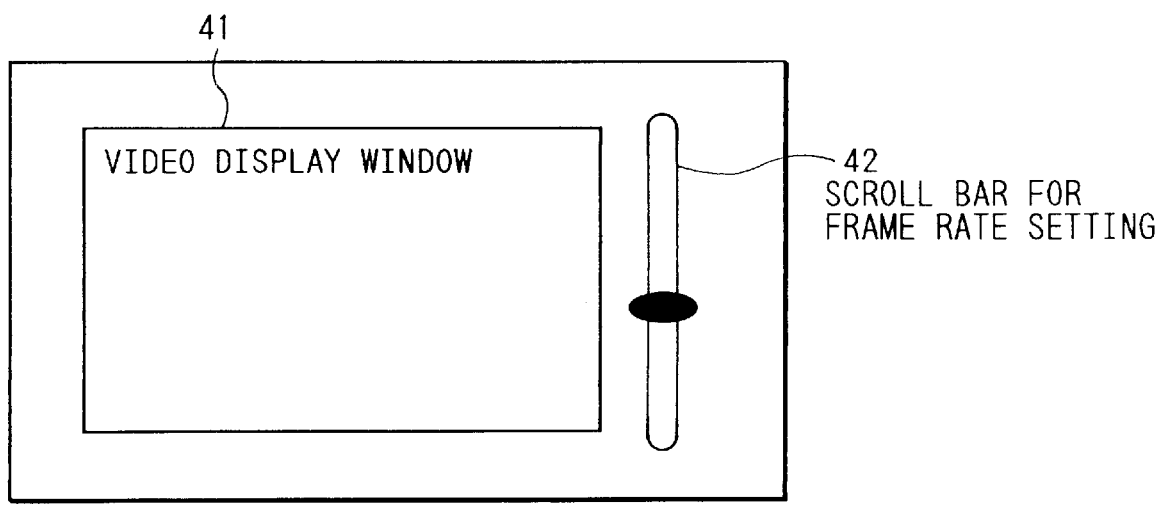
FIG. 20 is a view of GUI (Graphical User Interface) to be employed in a sink process of the second embodiment.
Figure 21:
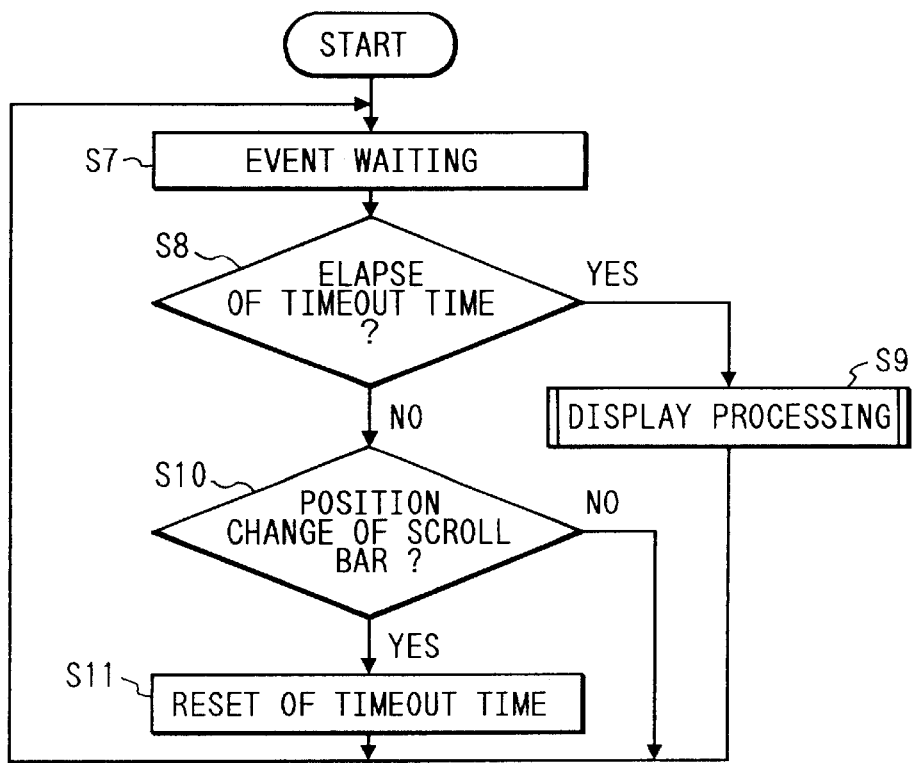
FIGS. 21 and 22 are flow charts of the control sequence of the sink process of the second embodiment.
Figure 22:
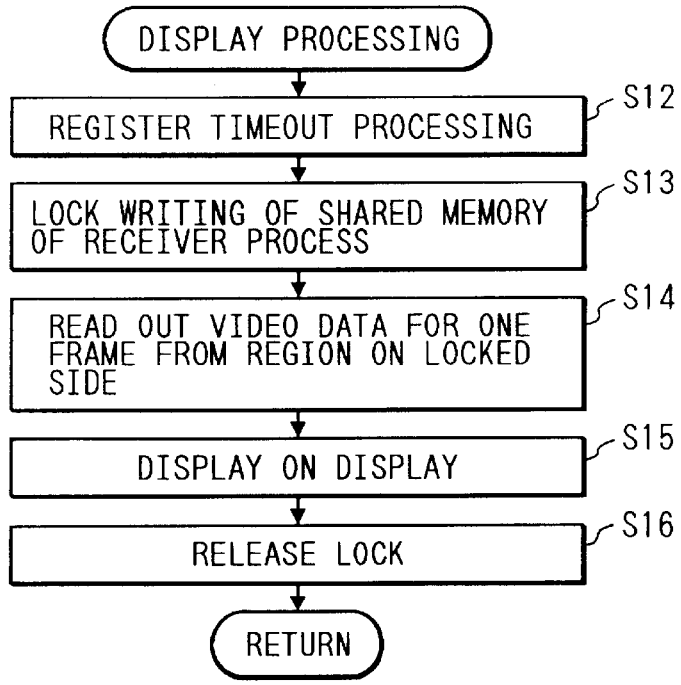

FIG. 20 shows the GUI employed in the SINK process 1033, and FIGS. 21 and 22 show the sequence of the SINK process 1033.

In FIG. 20 there are shown a window 1041 for displaying the received image, and a scroll bar 1042 for varying the frame rate of the received image. The SINK process 1033 controls the frame rate by utilizing a time-out sequence in the image display of a frame.

The scroll bar 1042 is manipulated with the mouse 1023 shown in FIG. 16 to elongate or shorten the period of time-out, thereby controlling the frame rate of the received image. The frame rate becomes lower or higher as the set time-out period becomes respectively longer or shorter, as will be explained later.

Referring to FIG. 21, the SINK process 1033 at first awaits, in a step S7, the occurrence of an event. The SINK process 1033 receives two events, which are the time-out and the manipulation of the scroll bar 1042 by the mouse 1023, and effects a process corresponding to each event.

The time-out event is generated by a registration so as to effect a display process shown in FIG. 22 at every predetermined interval TD. Thus, in a step S8 in FIG. 21, if the time-out period TD registered by the manipulation of the scroll bar 1042, the sequence proceeds to a step S9 to effect the display process shown in FIG. 22.

Referring to FIG. 22, a step S12 registers a next time-out period, whereupon the counting of the time-out period TD is started from the registration. Then a step S13 locks the first area A or the second area B of the common memory 1032, which is currently unlocked, so as to inhibit the image data storage by the RECEIVER process 1031.

Then a step S14 reads the image data of a frame from thus locked area of the common memory 1032, and a step S15 displays thus read image in the image display window 1041 of the display unit 1026. Finally a step S16 releases the lock set in the step S13, whereby the display process is terminated and the sequence return to the step S7 in FIG. 21.

In this process, if the time-out period TD is long, the image data of a frame stored in the common memory 1032 by the RECEIVER process 1031 in the course of the display process in the step S9 are overwritten by the image data of a next frame prior to the reading by the SINK process 1033. On the other hand, if the time-out period TD is short, the image data of a frame stored in the common memory 1032 by the RECEIVER process 1031 are read by the SINK process 1033 without being overwritten by the image data of the next frame. These processes correspond to the adjustment of the display frame rate between the RECEIVER process 1031 and the SINK process 1033 of the receiving side.

However, for precise control of the frame rate, it is necessary to register the time-out period prior to the display process in the step S15 in FIG. 22. If the time-out period is registered after the process of the step S15, the interval of image display becomes (TP+TD) which is different from the desired display internal TD, wherein TP is the time required for the. process of the step S15. In the present embodiment, therefore, the time-out period is registered in the step S12 preceding the step S15, as shown in FIG. 22.

Also the time-out period TD and the display process time have to satisfy a relation:

$$TD>TP$$

since the next image display process cannot be conducted if the time-out period expires before the image display process in the step S15 is completed.

In case there occurs the even of manipulation of the scroll bar 1042 by clicking and dragging of the mouse 1023, the sequence proceeds from the step S10 to S11 for resetting the time-out period corresponding to the varied position of the scroll bar 1042.

As explained in the foregoing, the second embodiment enables to control the frame rate of the displayed image in the receiving side. Thus, even in case plural image receiving apparatus with different performances are present on the network, the apparatus with a sufficient computing power can effect image display with a frame rate as high as the transmitting frame rate. On the other hand, the apparatus with a lower computing power can effect image display with a lowered frame rate. Consequently the transmitting side need not to control the transmitting frame rate in consideration of the computing powers of plural image receiving apparatus and the loads of computing thereof.

Third Embodiment

In the following there will be explained a third embodiment of the present invention.

The third embodiment is to provide a configuration for controlling the display frame rates of displayed images at the receiving side, in case an image-receiving information processing apparatus is provided for plural image-transmitting information processing apparatus and plural images transmitted from the transmitting side are simultaneously displayed in the receiving side.

Figure 23:
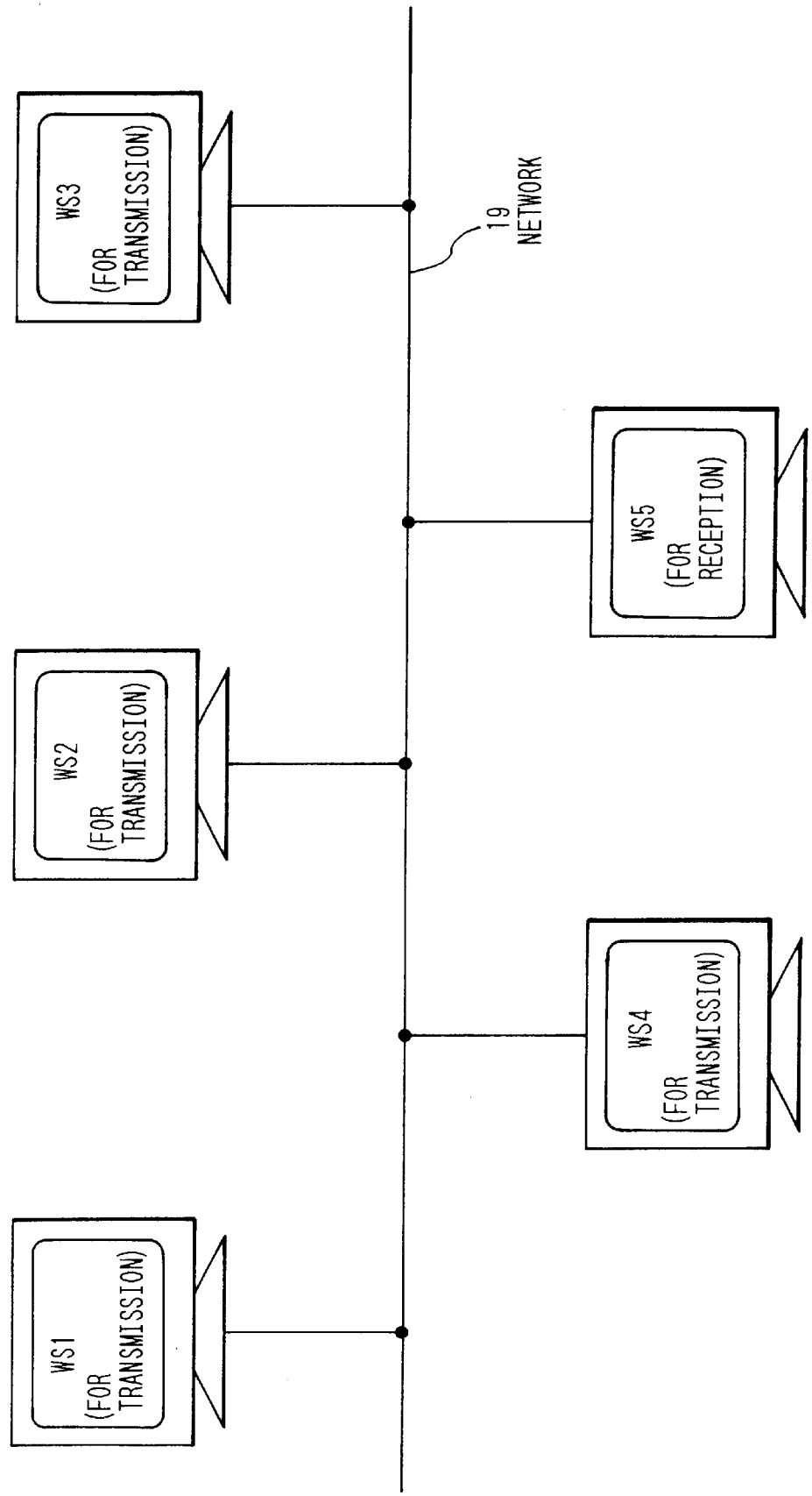
FIG. 23 is a block diagram showing the hardware configuration for realizing an image communication system of a third embodiment.

FIG. 23 shows an example of the hardware structure realizing the present embodiment.

In the present embodiment, image-transmitting work stations WS1 to WS4 of the configuration shown in FIG. 15 and an image-receiving work station WS5 of the configuration shown in FIG. 14 are connected to a network 19. The image transmitting work stations WS1 to WS4 and the image-receiving work station WS5 effects image display as in the second embodiment, utilizing the RECEIVER process, the SINK process and a memory.

Figure 24:
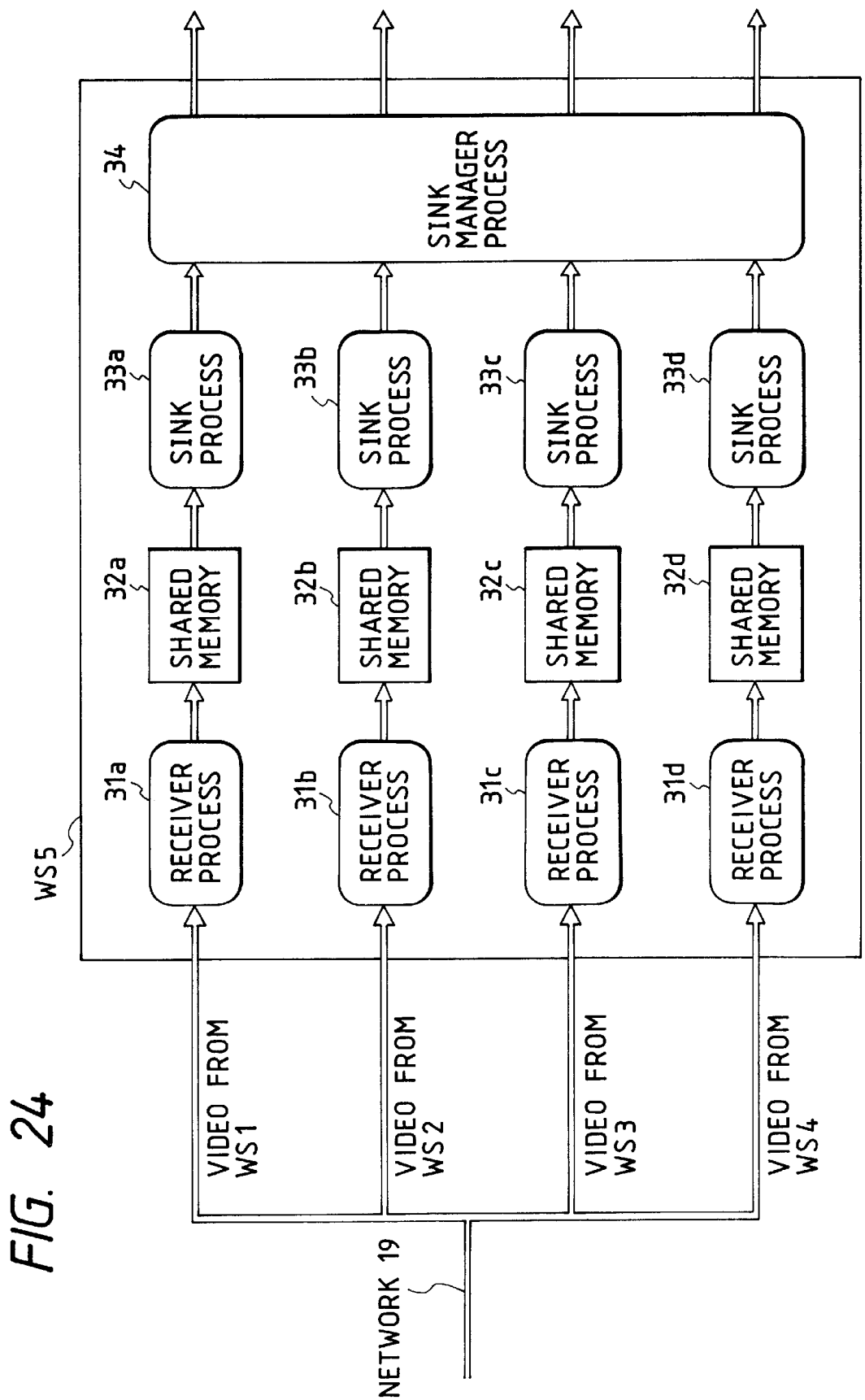
FIG. 24 is a view showing the processing configuration of a software for image reception and display in third embodiment.

FIG. 24 shows the process configuration of the software in the work station WS5, effecting the image reception and display.

As shown in FIG. 24, the image-receiving work station WS5 executes processes same as the RECEIVER process 31 and the SINK process 33 in the second embodiment for each of the images from the work stations WS1 to WS4, in order to receive the images respectively transmitted from the image-transmitting work stations WS1 to WS4 and to simultaneously display thus received images.

More specifically, for receiving and displaying the image transmitted from the first work station WS1, there are provided a RECEIVER process 31a and a SINK process 33a. Also for receiving and displaying the image transmitted from the second work station WS2, there are provided a RECEIVER process 31b and a SINK process 33b. In this manner RECEIVER processes 31a to 31d and SINK processes 33a to 33d are provided for receiving and displaying the images transmitted from the work stations WS1 to WS4.

Also as in the second embodiment, the RECEIVER processes 31a to 31d respectively transfer the image data to the SINK processes 33a to 33d through common memories 32a to 32d.

Also in the present embodiment, in order to unite the displays of the plural images transmitted from the work stations WS1 to WS4, there is provided a SINK Manager process 34, which constitutes a configuration for selecting, among the plural images, an image of interest to the user by a suitable user interface and controlling the frame rates of the image displays by the SINK processes 33a to 33d. It also manages the image display windows of the SINK processes 33a to 31d and the information of the work stations WS1 to WS4 in communication with the RECEIVER processes 31a to 31d.

Each of the RECEIVER processes 31a to 31d has to know the partner of communication among the first to fourth work stations WS1 to WS4, but there can be employed any communication process.

Figure 25:
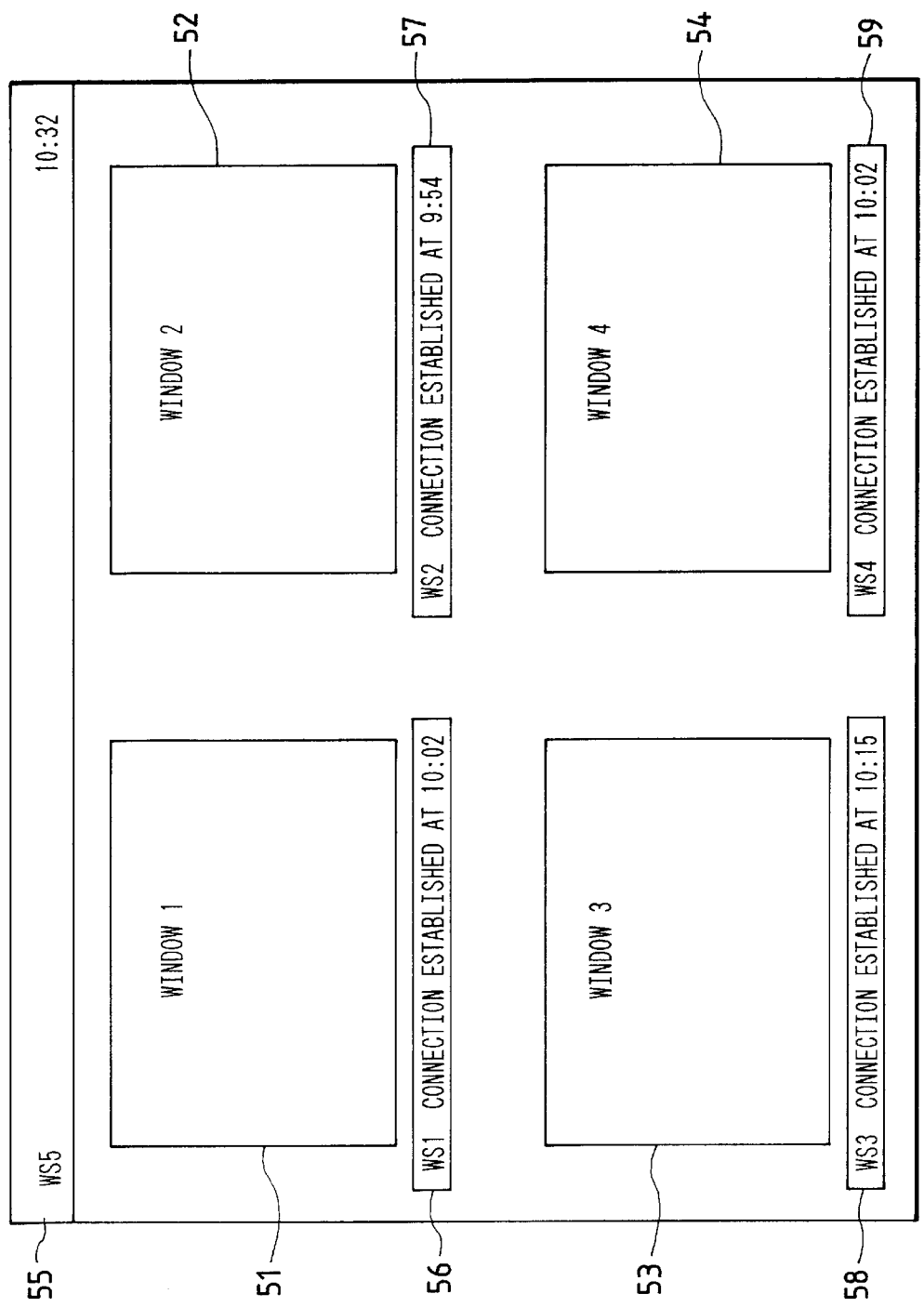
FIG. 25 is a view of GUI to be employed in a sink manager process.

FIG. 25 illustrates the GUI employed in the SINK Manager process 34.

In FIG. 25, first to fourth windows 51 to 54 are respectively used for displaying the images from the first to fourth work stations WS1 to WS4.

An area 55 is used for displaying the name of this work station WS5 and the current time. Areas 56 to 59 are used for displaying the information associated with the partners of communication, such as the names of stations WS1 to WS4 and the times of start of communication.

Figure 26:
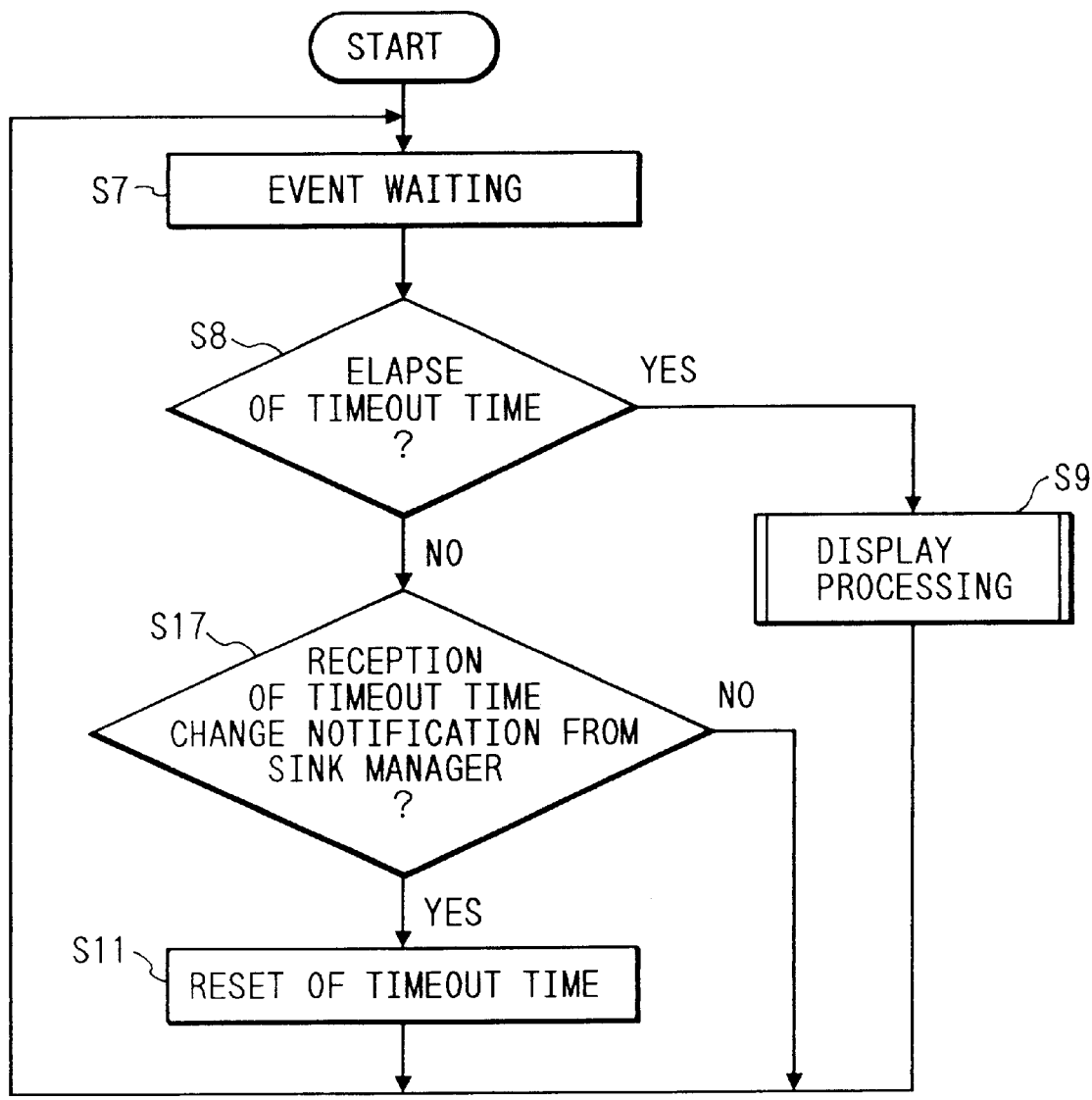
FIGS. 26 and 27 are flow charts of the control sequence of the sink process of the third embodiment.

FIG. 26 is a flow chart showing the sequence of the SINK processes 33a to 33d in the present embodiment.

The sequence in FIG. 26 is only different from the SINK process 33 in the second embodiment, shown in FIG. 21, in that the event to be received is the reception (step S17 in FIG. 26) of notice for variation of the frame rate (time-out period) from the SINK Manager process 34; instead of the variation (step S10 in FIG. 21) of the position of the scroll bar 42.

More specifically, in each of the SINK processes 33a to 33d, if a step S8 in FIG. 26 discriminates that the received event is not the expiration of the time-out period, the sequence proceeds to a step S17 for discriminating whether there has been received a notice from the SINK Manager process 34 for varying the time-out period. If the notice has been received, the sequence proceeds to a step S11 to reset the time-out period according to the content of the notice.

Figure 27:
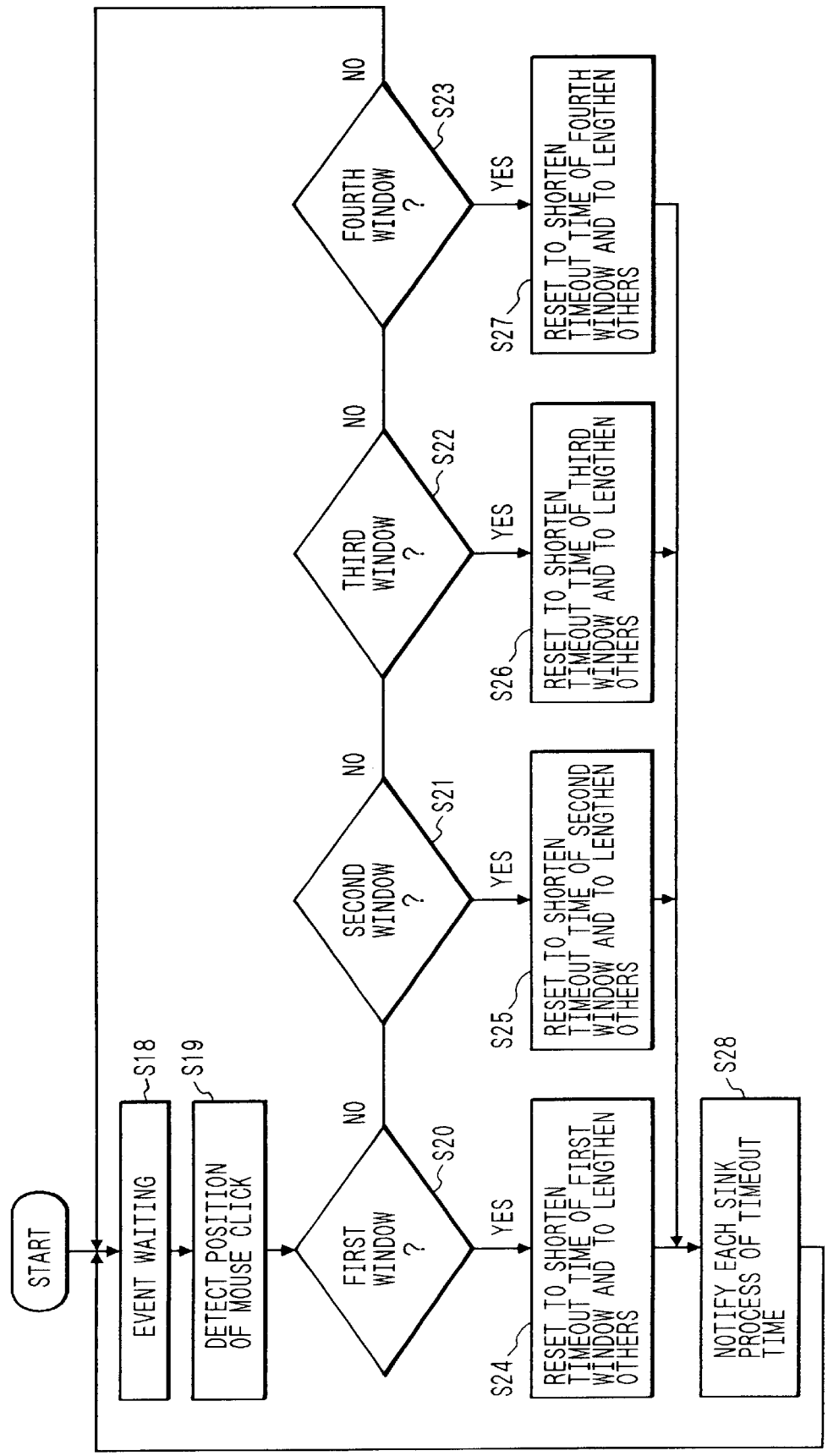

The above-mentioned notice for varying the time-out period by the SINK Manager process 34 is conducted according to a sequence shown in a flow chart in FIG. 27, which only shows the flow relating to the frame rate control by the change of the time-out period among the processes executed by the SINK Manager process 34.

In the present embodiment, the frame rate control is conducted in two levels, with a high frame rate of 30 frame/second and a low frame rate of 1 frame/second. The image watched by the used (watched image) is displayed with the frame rate of 30 frame/second, while the unwatched image is displayed with the frame rate of 1 frame/second.

In the present embodiment, the user interface for setting the watched image consists of mouse clicking on the display window of the watched image. By clicking the mouse on any of the first to fourth windows 51 to 54 shown in FIG. 25, the image displayed in thus clicked window becomes the watched image and is displayed with the frame rate of 30 frames/second while other windows are displayed with the frame rate of 1 frame/second.

Figure 28:
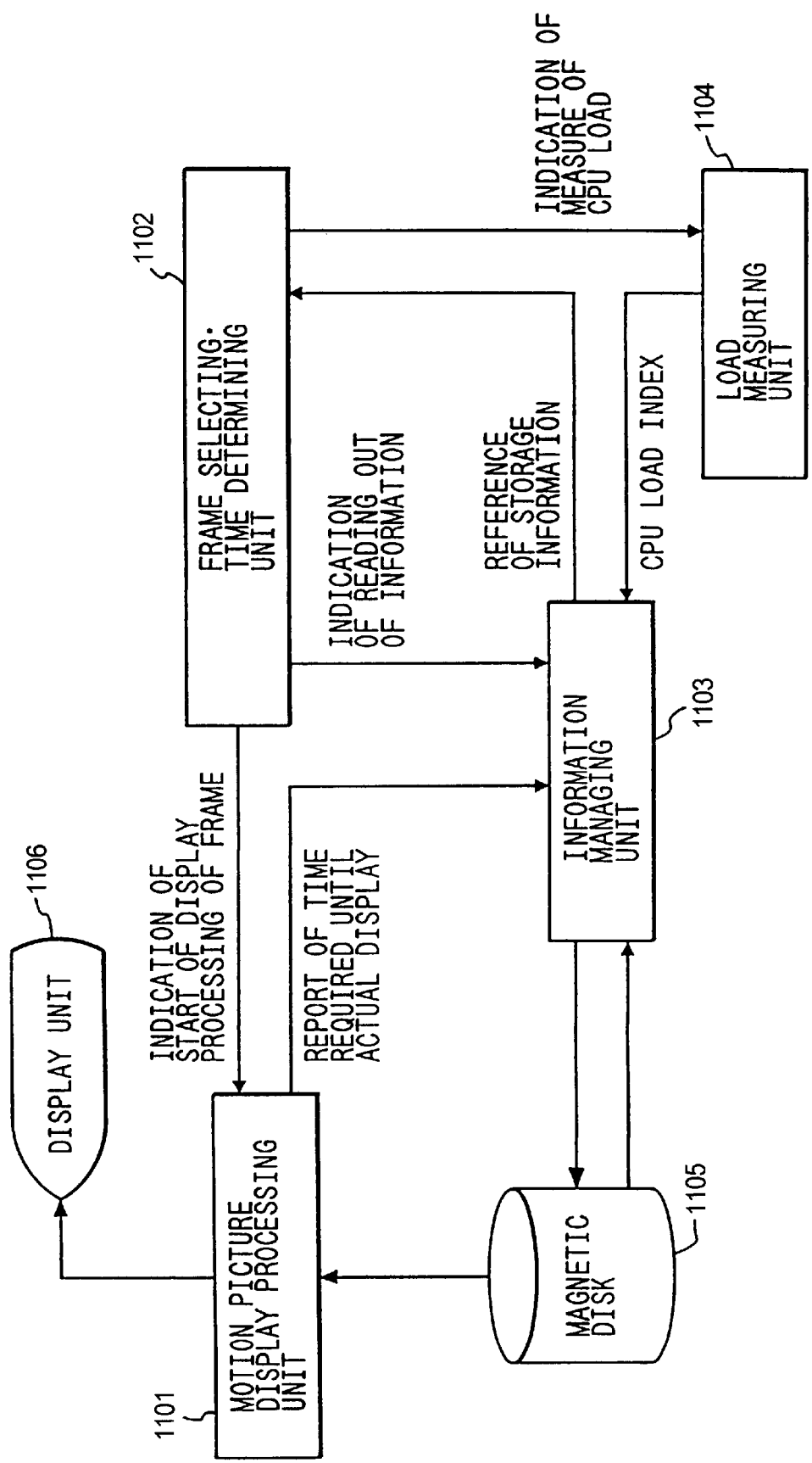
FIG. 28 is a schematic block diagram showing the functional configuration of the information processing apparatus of the present embodiment.

The SINK Manager process 34 awaits, in a step S18 in FIG. 28, the occurrence of an event. When a step S19 receives an event of mouse clicking, the position of the clicking is detected, and subsequent steps S20 to S23 discriminate which of the windows 51 to 54 corresponds to the mouse clicking.

If the mouse clicking has been done on the first window 51, the sequence proceeds from the step S20 to S24 to reduce the time-out period of the image displayed on the first window 51 (adopting the frame rate of 30 frame/second) and to elongate the time-out period of the images displayed in all other windows 52, 53, 54 (adopting the frame rate of 1 frame/second). Then a step S28 informs thus set time-out periods to the SINK processes 33a to 33d.

If the mouse clicking has been done on any of the second to fourth windows 52 to 54, the sequence branches to a corresponding one of steps S25 to S27 to reduce the time-out period of the image displayed in the window where the mouse clicking has been done and to elongate the time-out period for the images displayed in all other windows. Then a step S28 informs thus set time-out period to the SINK processes 33a to 33d.

As explained in the foregoing, the third embodiment allows to select, among the plural images transmitted to the receiving side through the network, an image watched by the user and to display the watched image along with a high frame rate and other unwatched images with a low frame rate. It is thus rendered possible to display the plural images with a reduced load to the computers, while satisfying the requirement of the user on the display quality to a certain extent.

The third embodiment explained above is designed to select a watched image among plural received images, but there may also be selected two or more watched images if sufficient computing power is available.

Also the third embodiment explained above employs a high frame rate of 30 frame/second and a low frame rate of 1 frame/second, but the present invention is not limited to such form, and the frame rates of the watched and unwatched images may be arbitrarily selected for example with a scroll bar 42 as shown in FIG. 21. Also in the third embodiment the variation in the frame rate is conducted in response to the mouse clicking, but method is not limitative. For example there may be provided a function for detecting the direction of visual axis of the user to automatically vary the frame rate according to the direction of the visual axis.

As explained in the foregoing, in the information processing apparatus and the information processing system of the present embodiment, there is provided frame rate varying means for arbitrarily varying the display frame rate of the received image whereby the received image can be displayed with a frame rate matching the computing power of the apparatus of the receiving side, regardless of the transmitting frame rate. Consequently the transmitting side can freely control the transmitting frame rate, without considering the computing power of the receiving side.

Consequently, even on a network on which computers of different performances are connected, the image receiving side can regulate the display frame rate according to the computing power and computing load of the receiving side, and thus the transmitted image can be commonly utilized by such plural computers.

Also the above-mentioned information processing apparatus is so constructed as to set a high frame rate for a received image selected by selection means, among plural images received through the network and displayed simultaneously on the display means, and a low frame rate for other received images, so that the user can obtain plural received image displays with the quality matching the intention of the user, while reducing the computing load for the image display, by arbitrarily selecting the display by the above-mentioned selection means. Also the transmitting side, constituting the partner of communication, can freely control the transmitting frame rate without considering the computing power of the information processing apparatus of the receiving side.

Fourth Embodiment

In the following there will be explained a fourth embodiment capable of resolving the following drawbacks in the frame reproduction in a single information processing apparatus. A CPU executing a moving image display program usually controls other processes. For example, under the function of a multi-task OS as in the work station, the CPU is often required to simultaneously execute other jobs. In such case, the CPU has to execute the reading of the moving image frame from a memory and the expansion of the moving image frame, if it is compressed in storage, until the completion of the display of the moving image frame. In such situation, the time required for such expansion varies according to the status of load of the CPU. For this reason the reproduction of the moving image may not be conducted smoothly the display of the reproduced frame may not be obtained at a suitable timing.

The present embodiment provides an information processing apparatus capable of displaying a moving image in continuous manner by determining the display time required for reading and expansion of the frame constituting the moving image and determining a frame to be displayed next and the display time thereof based on the required time, and capable of displaying a moving image in smooth manner by estimating the display time of a next frame based on the required display time of the foregoing frames, the CPU load in the foregoing frames and the current CPU load, and starting the display process of the next frame in consideration of the display time.

FIG. 28 is a functional block diagram of an information processing apparatus constituting the fourth embodiment.

A moving image display process unit 1101 reads selected frame data from a magnetic disk 1105 according to a frame display instruction from a frame selection/time determination unit 1102, and displays the data on a display unit 1106. The frame selection/timer determination unit 1102, constituting the main feature of the present embodiment, effects estimation of the time required for display process, selection of the frame to be displayed and determination of the start time of the display process, as will be explained later in more details. An information management unit 1103 accumulates sets of a frame number, time required to the display of the frame and CPU load on the past frame displays, and, in response to a request from the frame selection/time determination unit 1102, reads the accumulated information from the magnetic disk 1105 for supply to the frame selection/time determination unit 1102, which can thus determine the frame to be displayed next and the time of display thereof.

A load measurement unit 1104 measures the current load status of the CPU. In the present embodiment there is utilized information acquired by a common "xload" contained in the S Window System, which is a charge-free public domain software (PDS). The command "xload" is an application for displaying the system load average on the X Window, and can acquire the load index by direct access with /dev/kmem. The detailed method of access varies slightly depending on the apparatus, but can be easily determined from the source program, as the command "xload" belongs to the PDS. As an example, in the SUN work station, the load information of the CPU can be obtained by calculating a variable "loadavg" by the following C-language program:

define FSCALE (1<<8)
long temp;
read(kmem, (char #)&temp, sizeof(long));
loadavg=(double)temp/FSCALE.

Further referring to FIG. 28, the magnetic disk 1105 stores the moving image frame data, and the time required for display and the CPU load corresponding to the data of each frame. A display unit 1106 displays the moving image data processed in the display process unit 1101.

Figure 29:
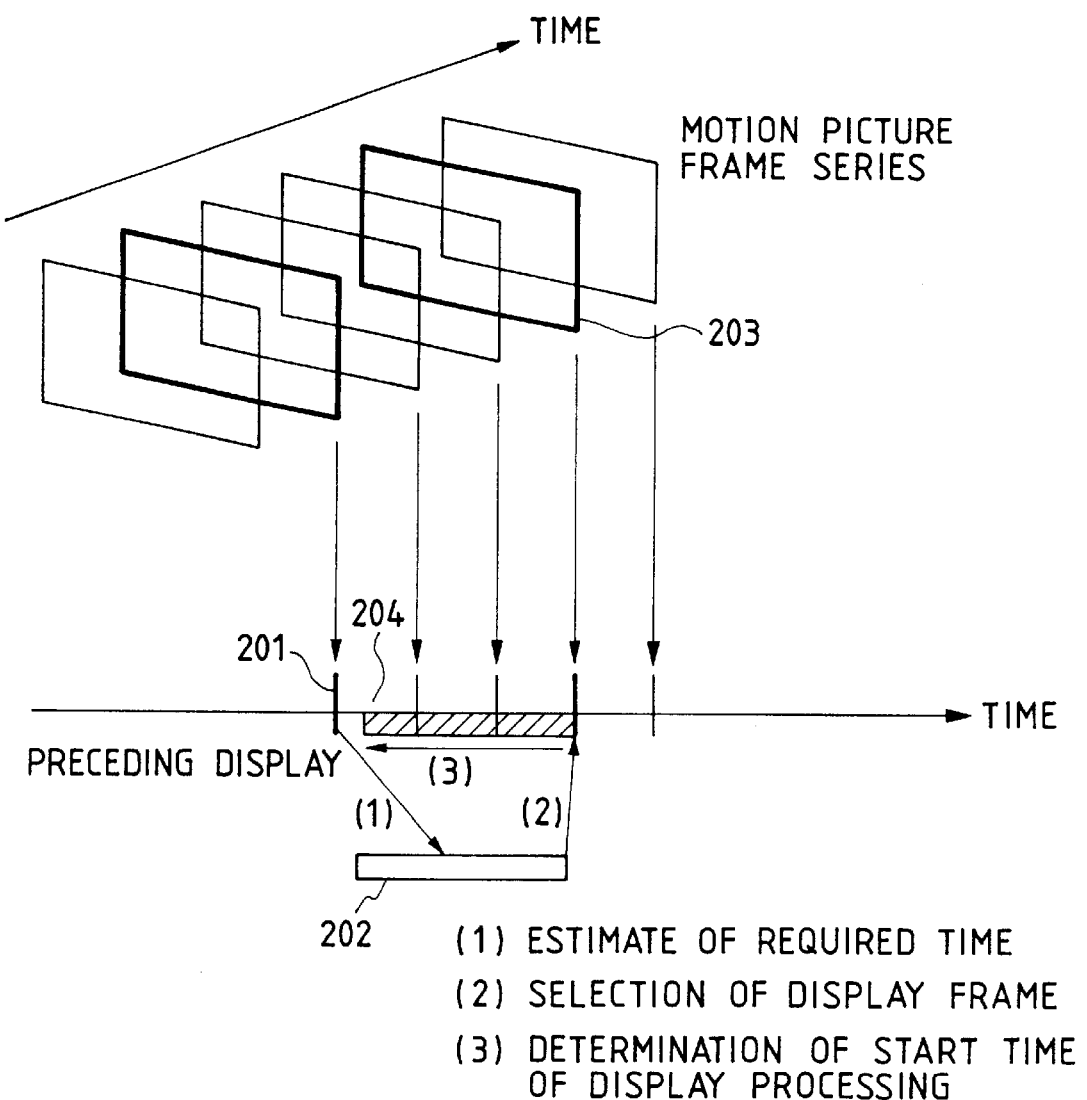
FIG. 29 is a view showing the display sequence of a frame in the information processing apparatus of the present embodiment.

FIG. 29 is a schematic view, roughly showing the sequential order of the processes of estimation of the time required for the display process, selection of the frame to be displayed and determination of the starting time of the display process, executed by the frame selection/time determination unit 1102 of the present embodiment.

At first, after the display of a frame at 201, there is estimated the time presumably required for the display process of the next frame (202). Then the frame to be displayed is selected, based on thus estimated required time (frame 203 in case of FIG. 29). Then determined is the display start time (204) of thus selected frame.

The estimation of the required time is conducted by determining the variation in the required time corresponding to the variation of the load, from the sum of the difference of the required time (dpy_time) divided by the difference in the load index (load_average) for the N sections of the past consecutive (N+1) frames, and averaging thus obtained parameter over the N sections in the following manner:

$$\text{parm} = [\Sigma((\text{dpy\_time}(\text{frame}(\text{now}-i)) - \text{dpy\_time}(\text{now-i-1}))/(\text{load\_average}(\text{frame}(\text{now}-i)) - \text{load\_average}(\text{frame}(\text{now-i-1}))))]/N \quad (1)$$

wherein $\Sigma$ indicates the summation for i=1−N. The estimated required time is given by:

$$\text{estimated\_dpy\_time} = \text{dpy\_time}(\text{frame}(\text{now}-1)) + \text{parm}*(\text{load\_average}(\text{frame}(\text{now})) - \text{load\_average}(\text{frame}(\text{now}-1))) \quad (2)$$

However, for the second to (N+1)-th frames in the beginning, the immediately preceding required time is taken as the estimated required time, since the averaging over N sections is not available. More specifically, the calculation is conducted by:

$$\text{estimated\_dpy\_time} = \text{dpy\_time}(\text{frame}(\text{now}-1)) \quad (3)$$

For the first frame, the calculation of the estimated required time is not conducted since the frame selection or the determination of the start time are unnecessary.

In the following there will be explained the procedure for selecting the frame to be displayed next, based on the estimated required time (estimated_dpy_time).

Figure 30:
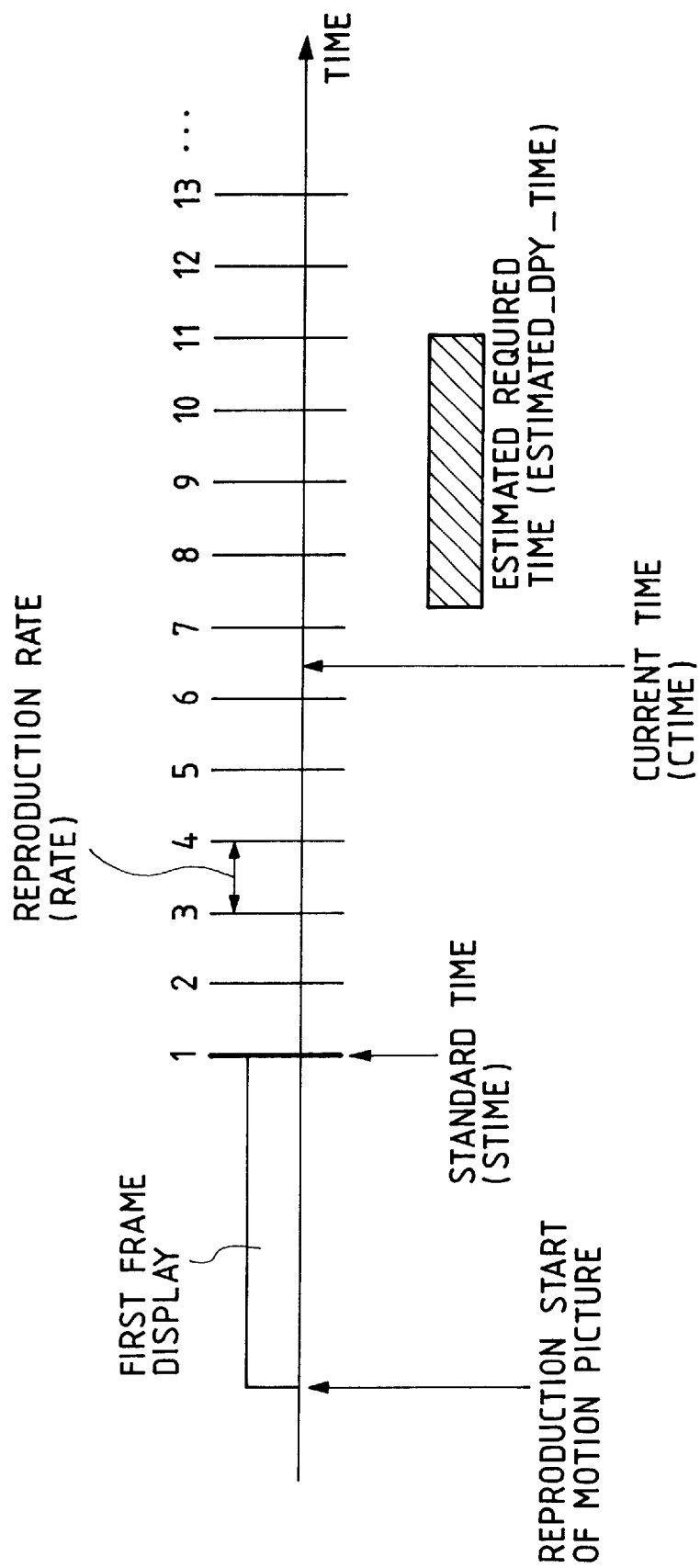
FIG. 30 is a view showing the concept of time to be referred to in the frame selection in the information processing apparatus of the present embodiment.

FIG. 30 shows the time scale to be referred to at the current time (ctime) when the next displayed frame is selected. The first frame is immediately displayed, and a standard time (stime) for moving image reproduction is taken immediately after the display.

The frames constituting the moving image are present at every reproduction rate. The frame to be displayed next can be obtained by:

$$\text{next\_frame} = \text{round\_up}((\text{ctime} + \text{estimated\_dpy\_time})/\text{rate}) + 1 \quad (4)$$

wherein round_up means rounding-up of the fraction below the decimal point.

In an example shown in FIG. 30, the estimated required time is about 4 times of the reproduction rate, so that the frame to be displayed next is a 5th frame from the currently displayed frame (i.e. frame 11 in FIG. 30).

The display process start time (start_time) of the next frame is determined by:

$$\text{start\_time} = \text{rate}*(\text{next\_frame}-1) - \text{estimated\_dpy\_time} + \text{stime}, \quad (5)$$

so that the frame display process can be started after (start_time-ctime) from the current time.

Figure 31:
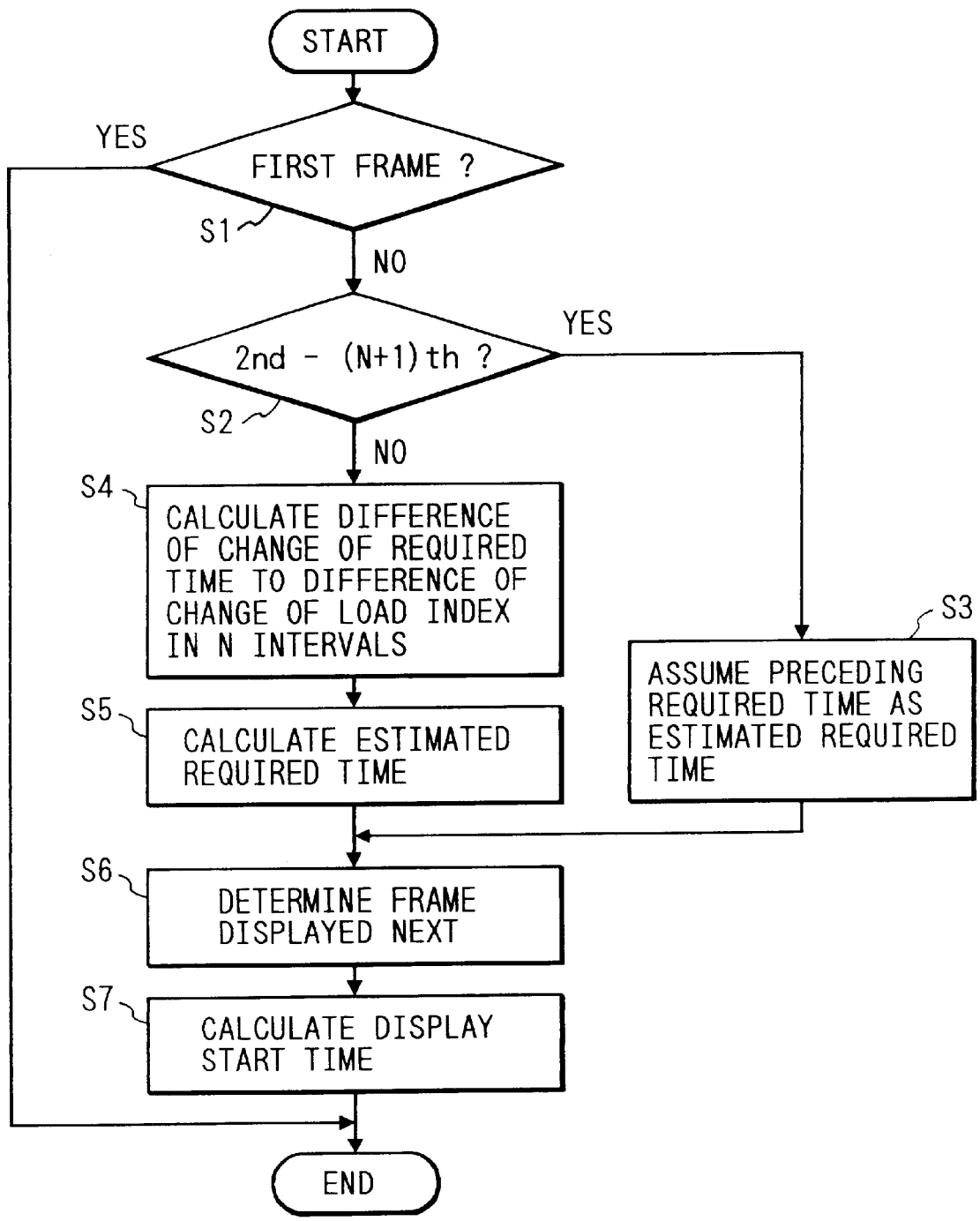
FIG. 31 is a flow chart of the control sequence in a frame selection/time determination unit in the information processing apparatus of the present embodiment.

FIG. 31 is a flow chart showing the control sequence of the frame selection/time determination unit 1102 of the present embodiment. When moving image display is instructed for example from an unrepresented control unit, information is read from the information management unit 1103, and the above-mentioned sequence is executed with reference to thus read information.

At first a step S1 discriminates whether the frame is the first frame. The first frame is displayed without determination of the display frame or the display time thereof. If it is not the first frame, a step S2 discriminates whether the frame belongs to the second to (N+1)-th frames. If so, a step S3 takes the required time of the preceding frame as the estimated required time, and then a step S6 determines the frame to be displayed next.

If the step S2 identifies that the frame is (N+2)-th or subsequent one, the sequence proceeds to a step S4 to determine the average of the variation of the required time for the variation of the load index over N sections according to the foregoing equation (1). Then a step S5 determines the estimated required time from thus determined value, according to the foregoing equation (2). Then a step S6 determines the frame to be displayed next, based on the estimated required time, the current time (ctime) and the moving image reproduction rate and according to the foregoing equation (4). Then a step S7 determines the display start time of thus selected frame according to the equation (5).

The frame and the display process start time thus determined are supplied to the moving image display process unit 1101.

In the moving image display process explained in the foregoing, if the estimated required time for the frame display can be determined in two levels, i.e. in the display preparation process and the frame display process, there is at first conducted the frame selection only, based on the estimated required time. Then immediately executed is the display preparation process of the frame, and the display time of the next frame is finally adjusted by inserting a waiting time, corresponding to the time required for the frame display process, before the frame display process. In this manner the moving image reproduction can be realized with more precise timing.

The present embodiment is applicable not only to a system composed of plural equipment but also to an apparatus consisting of a single equipment. It is furthermore applicable to a case where the present embodiment is achieved by the supply of a program to a system or an apparatus.

As explained in the foregoing, the present embodiment determines, in the course of moving image reproduction, the start time of the display process of a next frame, based on the selection of the frame to be displayed next and on the time require for reading the data of thus selected frame and for expanding the data if they are compressed. Also in the determination of the display start time, there is also considered the estimated time required for the frame display process, estimated from the current CPU load, whereby the moving image can be displayed in a smoother manner even under a situation where the CPU load varies dynamically.

As explained in the foregoing, the present embodiment enables smoother reproduction of a moving image.

Also the moving image can be displayed in a continuous manner, by determining the process time required for reading the frame data constituting the moving image and the expansion of the data, and determining the frame to be displayed next and the display start time of the frame, based on the process time.

Furthermore the moving image can be displayed in a smoother manner by estimating the display time of a next frame based on the required display times of the preceding frames, the CPU load in the preceding frames and the current CPU load, and starting the frame display process at a time in consideration of the display time.

The present invention is not limited to the foregoing embodiments but is subject to various modifications within the scope and spirit of the appended claims.

What is claimed is:

1. An information processing apparatus connected to a network to which plural information processing apparatus are connected, comprising:

recognition means for recognizing an instruction without passwords for a change of the amount of data released from one of the plural information processing apparatus; and control means for controlling the amount of image data released from said one information processing apparatus by changing the frame rate of the image data according to the instruction recognized by said recognition means, wherein said control means controls the amount of image data by varying the number of transmission requests given to an arbitrary one of the information processing apparatus.

2. An information processing apparatus according to claim 1, further comprising an image display unit.

3. An information processing apparatus according to claim 2, wherein the images entered from said plural information processing apparatus are subjected to multiple display in the image display unit.

4. An information processing apparatus according to claim 1, further comprising an image input unit.

5. An information processing apparatus according to claim 1, wherein said image data transmitted through said network are of a predetermined data amount.

6. An information processing apparatus according to claim 1, wherein said instruction for variation is an instruction for varying the frame rate of the image data.

7. An information processing apparatus according to claim 6, wherein said control means is adapted to effect control to increase or decrease said frame rate.

8. An information processing apparatus, belonging to plural information processing apparatus connected, through a network, to a network-managing information processing apparatus, comprising:

reception means for receiving, at an arbitrary timing, data for requesting output of image data, from said network-managing information processing apparatus through said network; and output means for releasing the image data to said network in response to said received output request data, wherein said output permission data are variably generated by said managing information processing apparatus, in response to an instruction without passwords from the plural information processing apparatus, and the amount of image data is controlled by varying the number of output requests given to an arbitrary one of the information processing apparatus.

9. An information processing apparatus according to claim 8, further comprising input means for entering said image data.

10. An information processing apparatus according to claim 8, further comprising display means for displaying the image data transmitted through said network.

11. An information processing apparatus according to claim 10, wherein said display means is adapted to display the image data from said plural information processing apparatus in multiple images corresponding to the number of said information processing apparatus.

12. An information processing apparatus according to claim 11, wherein said instruction is directed to arbitrary one among said plural information processing apparatus and is given in response to an instruction from an instruction unit displayed on said display means of said plural information processing apparatus.

13. An information processing apparatus according to claim 8, wherein said instruction is to increase or decrease the transmission frame rate of said image data.

14. An information processing apparatus according to claim 13, wherein, if an increase in said transmission frame rate is instructed, said managing information processing apparatus increases the number of issuances of the output request data.

15. An information processing apparatus according to claim 13, wherein, if a decrease in said transmission frame rate is instructed, said managing information processing apparatus decreases the number of issuances of the output request data.

* * * * *